United States Patent [19]

Kawauzra et al.

[11] Patent Number: 5,679,744
[45] Date of Patent: Oct. 21, 1997

[54] RUBBER COMPOSITION

[75] Inventors: Tetsuji Kawauzra; Sadafumi Aibe; Masayuki Kawazoe, all of Hiratsuka, Japan

[73] Assignee: The Yokohama Rubber Co., Ltd., Tokyo, Japan

[21] Appl. No.: 556,014

[22] Filed: Nov. 9, 1995

[30] Foreign Application Priority Data

| Nov. 11, 1994 | [JP] | Japan | 6-277795 |
| Jan. 19, 1995 | [JP] | Japan | 7-006553 |
| Jan. 19, 1995 | [JP] | Japan | 7-006565 |
| Jan. 19, 1995 | [JP] | Japan | 7-006567 |
| Apr. 14, 1995 | [JP] | Japan | 7-089577 |
| May 12, 1995 | [JP] | Japan | 7-114827 |

[51] Int. Cl.$^6$ .............................. C08L 9/00; C08L 53/00
[52] U.S. Cl. .............................. 525/98; 525/99; 525/314
[58] Field of Search ............................ 525/98, 99, 314

[56] References Cited

FOREIGN PATENT DOCUMENTS

| 53-133248 | 11/1978 | Japan. |
| 59-142236 | 8/1984 | Japan. |
| 60-44538 | 3/1985 | Japan. |
| 60-137945 | 7/1985 | Japan. |
| 61-218404 | 9/1986 | Japan. |
| 63-89547 | 4/1988 | Japan. |
| 1-167347 | 7/1989 | Japan. |
| 4-356544 | 12/1992 | Japan. |
| 5-170973 | 7/1993 | Japan. |

OTHER PUBLICATIONS

Natural Rubber and Butadiene Rubber Blend Using Diblock Copolymer of Isoprene-Butadiene as Compatibilizer, Bualek et al., J. Applied Polymer Science, vol. 49, pp. 807–814.

*Primary Examiner*—Mark L. Warzel
*Attorney, Agent, or Firm*—Finnegan, Henderson, Farabow, Garrett & Dunner

[57] ABSTRACT

A rubber composition suitable for use, for example, a tire and a belt containing a natural and/or polyisoprene rubber, and/or styrene-butadiene copolymer rubber, polybutadiene rubber, and/or an A-B type block copolymer of styrene and butadiene and optionally, a softening agent, a foaming agent, a foaming assistant.

18 Claims, No Drawings

RUBBER COMPOSITION

BACKGROUND OF THE INVENTION

1. Field of the Invention

The present invention relates to a rubber composition suitable for use as, especially, a tire tread and other portions of a tire etc. More specifically, the present invention relates to a rubber composition, especially for a tire tread, capable for improving the rubber strength such as tear strength, or abrasion resistance, or fatigue resistance and external damage resistance, without adversely affecting viscoelastic properties, ice skid resistance, wet braking or fuel consumption, which is useful, for example, for use in a cap and side tread for both passenger and track-bus tires etc.

2. Description of the Related Art

In recent years, improvements have been sought in the performances of rubber compositions for, for example, automobile tires such as running stability, low fuel consumption. For example, as a rubber composition for a tire tread, low heat generation as well as good grip characteristics and abrasion resistance are required and as a rubber composition for a tire side wall the improvement in external damage resistance and fatigue life under the repeated deformation are required.

Various attempts have been made in the art. For instance, JP-A-61-218404 discloses a low fuel consumption rubber composition for a cap tread using silica as a reinforcing filler. However, this composition has a problem of abrasion resistance.

JP-A-5-1298 proposes the low heat generation rubber composition from terminal modified (aromatic test-amino group) polymer, but this composition has a problem in the abrasion resistance.

JP-4-356544 proposes the decrease in rolling resistance and the improvement in the low temperature characteristics by compounding the special dinitrodiamino compounds, but this is only effective for polyisoprene.

Furthermore, JP-A-5-170973 proposes a rubber composition for a tire tread having an improved low heat generation with maintaining a high abrasion resistance by compounding the specially improved carbon black. However, further improvement from the polymer side due to further increased needs for the high abrasion resistance and low fuel consumption.

Furthermore, blends of natural rubber, and polybutadiene rubber are mainly used in the past as a rubber composition for a tire side wall, but, when the gauge is intended to decrease due to the requirements for a light weight tire, the external damage resistance is unpreferably decreased.

On the other hand, for a long time now, cars running on roads in snow prone cold areas have been equipped in the winter season with "spike tires" having spikes driven into the tire rubber or have had snow chains attached to the outer circumference of the tires so as to ensure safety on snow covered or icy roads. Spike tires and tires equipped with snow chains, however, abrade and scratch the roads. The dust from this causes air pollution. This is becoming a major environmental issue. To resolve this safety problem and environmental problem, "studless tires" which do not use spikes or chains but enabling braking and driving on snow or ice are rapidly becoming popular.

Various proposals have been made in the past regarding improvements of the braking and driving performance of such studless tires on ice. For example, Japanese Unexamined Patent Publication (Kokai) No. 60-137945 discloses that use of a rubber composition including a specific softening agent for the tread rubber enables a reduction in the hardness at low temperatures and therefore a remarkable increase in the frictional resistance on ice-covered road surfaces without causing a marked reduction in the frictional resistance on wet road surfaces. Further, Japanese Unexamined Patent Publication (Kokai) Nos. 53-133248, 59-142236, and 60-44538 disclose to raise the frictional resistance on ice-covered road surfaces by compounding into the rubber formulation a powdered rubber which hardens on ice and softens at temperatures higher than that, inorganic granules, or fibrous, rod-like, or conical organic or inorganic substances.

Japanese Unexamined Patent Publication (Kokai) No. 63-89547 discloses to randomly dispose around the independent cells in a foam rubber composition fibrous substances of an average length of 10 to 5000 μm and the aspect ratio of 10 to 1000 so as to improve the slip resistance of a tire on ice while maintaining the abrasion resistance. Further, Japanese Unexamined Patent Publication (Kokai) No. 1-167347 discloses to improve the ice-skid resistance by compounding a vulcanized rubber composition which is prevulcanized and has an average particle size of not more than 2 mm into the rubber composition for a tire tread.

While each of the above proposals improves the frictional resistance on ice-covered road surfaces, however, each also has a detrimental effect on the strength of the rubber, such as the tear strength, so suffers from the problem of stripping and breakage of the blocks of the studless tires.

Furthermore, in recent years, improvements have been sought in the performances of rubber compositions for automobile and other tires. Accordingly, a number of polymers have been blended in the rubber for tire treads etc. When these polymers are incompatible, however, interfaces between each polymer phase are existing. In many cases, these interfaces serve as starting points of breakage and are considered to have a detrimental effect on the tensile strength, tear strength, abrasion resistance, and other properties. In the past, however, sufficient consideration had not been given to the problem of interfaces between different polymer phases of rubber/rubber blends in tires and other rubber products. No means of solution of this problem could be found either.

In the past, sufficient consideration had not been given to the reduction in the breaking properties caused by the incompatibility of polymer blends when compounding block polymers. There was only a description of compounding a small amount of a block copolymer of a polybutadiene (BR) and polyisoprene (IR) in a blend of a natural rubber (NR)/polybutadiene rubber (BR) in J. Apply. Polym. Sci., 49 (1993) and RCT. 66 (1993). These references, however, just consider block polymers with isoprene blocks and butadiene blocks do not comprehensively consider block polymers having SBR blocks which are more industrially useful and which are possible to be used in many kinds of polymer blend systems.

SUMMARY OF THE INVENTION

Accordingly, the objects of the present invention are to eliminate the above-mentioned disadvantages of the prior art and to provide a rubber composition having increased abrasion resistance with retaining good conditions of grip properties and low fuel consumption.

Another object of the present invention is to provide a rubber composition having improved external damage resistance and fatigue life under repeated stress, while satisfying the requirement of light weight.

A further object of the present invention is to provide a rubber composition having improved abrasion resistance or improved rubber strength such as tear strength, without affecting the adverse effect on the viscoelastic properties or ice-skid resistance.

Other objects and advantages of the present invention will be apparent from the following description.

In accordance with the present invention, there is provided a rubber composition comprising (i) at least one rubber selected from the group consisting of natural rubber and polyisoprene rubber;

(ii) at least one rubber selected from the group consisting of styrene-butadiene copolymer rubber and polybutadiene rubber; and (iii) an A-B type block copolymer composed of a block (A) having a styrene content (St) of 0 to 30% by weight and a butadiene content (Bd) of 100 to 70% by weight and having a 1,2-vinyl bond content (Vn) of 5 to 40% and a block (B) having a styrene content (St) of 0 to 30% by weight and a butadiene content (Bd) of 100 to 70% by weight and having a 1,2-vinyl bond content (Vn) of 70% or more, the weight ratio of (A)/(B) being 20 -80/80 -20 and the content of the A-B type block copolymer being 0.5 to 20 parts by weight based on 100 parts by weight of the total amount of the components (i), (ii), and (iii).

In accordance with the second aspect of the present invention, there is provided a rubber composition for a tire tread comprising (i) at least one rubber selected from the group consisting of natural rubber and polyisoprene rubber, (ii) at least one rubber selected from the group consisting of polybutadiene rubbers having a 1,2-vinyl bond content (Vn) of not more than 30%, (iii) an A-B type block copolymer composed of a block (A) having a styrene content (St) of 0 to 30% by weight and a butadiene content (Bd) of 100 to 70% by weight, and having a 1,2-vinyl bond content of 5 to 40% and a block (B) having a styrene content (St) of 0 to 30% by weight and a butadiene content (Bd) of 100 to 70% by weight, and having a 1,2-vinyl bond content (Vn) of at least 70%, the weight ratio of (A)/(B), being 20 -80/80 -20, and (iv) at least one softening agent selected from the group consisting of an aromatic oil, paraffinic oil, and ester plasticizer, the weight ratio of the components (i) and (ii) being 70 to 30/30 to 70, the amount of compounding of the A-B type block copolymer of the component (iii) being 2 to 20 parts by weight based upon 100 parts by weight of the total of the components (i), (ii), and (iii), and the content of the softening agent being 5 to 50 parts by weight based upon 100 parts by weight of the total of the components (i), (ii), and (iii).

In accordance with the third aspect of the present invention, there is provided a rubber composition comprising (i) at least one rubber selected from the group consisting of natural rubber and polyisoprene rubber, (ii) at least one rubber selected from the group consisting of high cis-polybutadiene rubbers, and (iii) an A-B type block copolymer composed of a poly(styrene-butadiene) or polybutadiene block (A) having a styrene content (St) of 0 to 35% by weight and a butadiene content (Bd) of 65 to 100% by weight, and having a 1,2-vinyl bond content (Vn) of 5 to 80% and satisfying the relationship of $Vn \leq 2St+30$ and a poly(styrene-butadiene) or polybutadiene block (B) having a styrene content (St) of 0 to 30% by weight, a butadiene content (Bd) of 70 to 100% by weight and having a 1,2-vinyl bond content (Vn) satisfying the relationship of $Vn>2St+30$, the weight ratio of (A)/(B), being 20 to 80/80 to 20, the content of the A-B type block copolymer being 2 to 20 parts by weight based upon 100 parts by weight of the total of the components (i), (ii), and (iii).

In accordance with the fourth aspect of the present invention, there is provided a rubber composition comprising (i) at least one rubber selected from the group consisting of natural rubber and polyisoprene rubber, (ii) at least one rubber selected from the group consisting of high cis-polybutadiene rubbers, and (iii) an A-B type block copolymer composed of (a) a poly(styrene-butadiene) block (A) having a styrene content (St) of not more than 35% by weight, and a butadiene content (Bd) of at least 65% by weight, and having a 1,2-vinyl bond content (Vn) of 5 to 80% and satisfying the relationship of $Vn \leq 2St+30$ or (b) a polybutadiene block (A) having a 1,2-vinyl bond content (Vn) of more than 10% and not more than 30% and a polyisoprene block (B) having a cis-content of not less than 70% by weight, the weight ratio of (A)/(B), being 20 to 80/80 to 20, the content of the A-B type block copolymer being 2 to 20 parts by weight based upon 100 parts by weight of the total of the components (i), (ii), and (iii).

In accordance with the fifth aspect of the present invention, there is provided a rubber composition comprising (i) at least one rubber selected from the group consisting of styrene-butadiene copolymer rubbers (SBR) having a glass transition point (Tg) of not less than −40° C., (ii) at least one rubber selected from the group consisting of styrene-butadiene copolymer rubbers (SBR) and/or polybutadiene rubbers (BR) which is incompatible with the above SBR component (i) and which has a Tg of at least 10° C. lower than the Tg of the SBR component (i) and (iii) an A-B type block copolymer composed of a block A comprising a styrene-butadiene copolymer (SBR) or polyisoprene (IR) which is compatible with the SBR component (i) and incompatible with the SBR and/or BR component (ii), and a block B comprising a styrene-butadiene copolymer (SBR) or polybutadiene (BR) which is compatible with the SBR or BR component (ii) and incompatible with the SBR component (i), in an amount of 1 to 20 parts by weight based upon 100 parts by weight of the total of the components (i), (ii), and (iii).

In accordance with the sixth aspect of the present invention, there is provided a rubber composition comprising (i) 80 to 99 parts by weight of at least two incompatible diene rubbers A and B wherein the weight ratio A/B of the diene rubbers A and B=10/90 to 90/10 and (ii) 1 to 20 parts by weight of an A'-B' block polymer composed of a block A' compatible with the diene rubber A and incompatible with B and a block B' compatible with both the diene rubbers A and B, wherein first the A'-B' block polymer, diene rubber B, and at least 10 parts by weight of a reinforcing filler based upon 100 parts by weight of the total of the rubber and polymer are mixed and then diene rubber A is added and mixed.

In accordance with the seventh aspect of the present invention, there is provided a rubber composition comprising (i) at least one rubber selected from the group consisting of natural rubber and a polyisoprene rubber, (ii) a styrene-butadiene copolymer rubber (SBR) having a styrene content (St) of not more than 50% by weight and a 1,2-vinyl bond content (Vn) of the butadiene moiety of not more than 80 mol % and satisfying the relationship of $Vn \leq 2St+30$ and (iii) an A-B type block copolymer composed of (a) a poly(styrene-butadiene) block (A) having a styrene content (St) of 0 to 50% by weight and a butadiene content (Bd) of 50 to 100% by weight, and having a 1,2-vinyl bond content (Vn) of 5 to 70% and satisfying the relationship of $Vn \leq 2St+30$ or (b) a polybutadiene block (A) having a 1,2-vinyl bond content (Vn) of 5 to 30% and a polyisoprene block (B) having a cis-content of not less than 70% by weight, the weight ratio (A)/(B), being 20 to 80/80 to 20, the content of the A-B type block copolymer being 2 to 20 parts by weight based upon 100 parts by weight of the total of the components (i), (ii), and (iii).

DESCRIPTION OF THE PREFERRED EMBODIMENTS

According to the first aspect of the present invention, it is possible to improve the abrasion resistance as well as the fatigue resistance and the external damage resistance, without causing a reduction in the low heat generation and grip characteristics, by compounding into a blend of (i) an NR and/or IR and (ii) a SBR and/or BR, (iii) specific block copolymer (A-B). Furthermore, according to the present invention, 20 to 100 parts by weight of a reinforcing agent (e.g., carbon black and/or silica may be optionally added, based upon 100 parts by weight of the total amount of the rubbers.

According to the second aspect of the present invention, it is possible to enhance the strength of the rubber, for example, the tear strength, without causing a reduction in the ice-skid resistance by compounding, into a blend of (i) an NR and/or IR and (ii) BR, a (iii) specific block copolymer (A-B) and further compounding a specific softening agent.

The NR, IR, and BR compounded in the rubber composition according to the first and second aspects of the present invention may be any polymers generally used as rubber components for various rubber applications in the past. The ratio of the blend of the NR/IR and the ratio of the blend of the (i) NR and/or IR/(ii) BR may be selected in accordance with the application of the rubber composition. The ratio of the blend of the NR (and/or IR)/BR may be suitably selected by a person skilled in the art. For example, the NR (and/or IR)/BR (weight ratio) is 70 to 30/30 to 70, preferably 65 to 35/35 to 65. If the NR is over 70 in the NR (and/or IR)/BR ratio, the Tg of the system as a whole becomes higher, so there is poor flexibility at low temperatures and the ice-skid resistance ends up falling, while if the BR exceeds 70, the breaking strength of the compound ends up falling to an extreme extent and the practical value is lost. Further, the processability in kneading, extrusion, and molding also ends up falling.

According to the first and second aspects of the present invention, it is possible to achieve the object of the present invention by compounding a specific A-B type block copolymer into the above blend system. If the amount of compounding of the A-B type block copolymer is too small, the desired effect of improvement is not obtained, while conversely if too large, the inherent physical properties of the rubber, that is, the low heat buildup and grip performance are lost. From this viewpoint, the A-B type block copolymer used in the present invention is compounded in an amount of 2 to 20 parts by weight, preferably 5 to 18 parts by weight of the A-B type block copolymer with respect to 100 parts by weight of all of the polymer components (including also the A-B type block copolymer).

The A-B type block copolymer used in the present invention is composed of a butadiene alone or a styrene (ST) and butadiene and has a styrene content (ST) of the block components A and B, a 1,2-vinyl bond content (VN), and a weight ratio (A)/(B) of the component A and the component B as follows:

(A) Styrene content=0 to 30% by weight, preferably 5 to 30% by weight

Vinyl content=5 to 40%, preferably 5 to 30%

(B) Styrene content=0 to 30% by weight, preferably 5 to 30% by weight

Vinyl content=at least 70%, preferably 73 to 80%

(A)/(B)=20 to 80/80 to 20, preferably 25 to 65/65 to 25

If the styrene content of the block component (A) is too large, the compatibility with the BR becomes small and the effect of improvement of the tear strength is lost. Further, if the 1,2-vinyl bond content in the block component (A) is too small, the manufacture becomes difficult, while if too great, the compatibility with BR again becomes small and the desired effect ends up being lost.

On the other hand, if the styrene content of the block component (B) is too large, the compatibility with the NR becomes poor and in turn the effect of improvement of the tear strength etc. is reduced. Further, if the 1,2-vinyl bond content in the block component (B) is too small, the effect of improvement of the tear strength etc. falls due to similar reasons. Further, if too great, the manufacture becomes difficult.

The A-B type block copolymer used in the first and second aspects of the present invention is a known polymer. In general, the block (A) is produced by causing polymerization of for example a butadiene or a styrene and butadiene in an organic solvent such as hexane using an organic alkali metal compound catalyst such as butyllithium, while the block (B) is produced by further adding to this block in the end-living state for example a butadiene or a styrene and butadiene, so it is possible to obtain the desired block copolymer by suitably selecting the weight ratio of compounding of the monomers, the addition of a vinylation agent, the polymerization conditions, etc. at that time. Note that the A-B type block copolymer may be end-modified by a modifier such as, for example, a ring amine, a compound having the following bond:

wherein M represents an oxygen atom or sulfur atom, for example, an amide compound, imide compound, lactam compound, urea compound, etc. and that the end-modified block may be produced by adding a suitable modifier in the living state after the completion of the copolymerization of the A-B type block copolymer. Further, coupling between A-B block polymers through an Si atom and Sn atom is also possible.

The molecular weight of the A-B type block copolymer compounded in the present invention is not particularly limited, but considering the entanglement or cross-linkability with the matrix rubbers, the weight average molecular weight is preferably at least 30,000, more preferably 50,000 to 800,000.

According to the second aspect of the present invention, at least one softening agent selected from the group consisting of aromatic oils, paraffinic oils, and ester plasticizers is compounded in the rubber composition. The softening agent is compounded in an amount of 5 to 50 parts by weight, preferably 5 to 30 parts by weight, with respect to 100 parts by weight of all of the rubber components, that is, the components (i), (ii), and (iii). If the amount of compounding of the softening agent is less than 5 parts by weight, the hardness of the compound becomes high and the flexibility low, so the ice-skid resistance is not sufficient. Further, if over 50 parts by weight, the breaking properties of the compound drop.

For the softening agent used in the present invention, it is possible to use any aromatic oil, paraffinic oil, or ester plasticizer normally used in a rubber composition. The aromatic oil or paraffinic oil may be made an oil generally used in rubber formulations. As preferable examples of an ester plasticizer, fatty acid esters of dibutyl phthalate, dioctyl phthalate, higher alcohol phthalate, diisodecyl phthalate, dibutyl adipate, dioctyl adipate, diisodecyl adipate, dioctyl sebacate, and trimethylolpropane may be mentioned.

According to a preferred embodiment of the present invention, there is further provided a rubber composition comprised of a rubber composition into which is mixed a foaming agent and a urea based foaming assistant to give an average cell area occupancy of the tread surface of 1 to 4%, preferably 1.5 to 3.5%. It is known that compounding a foaming agent and ureic foaming assistant and causing the rubber formulation to foam enables elimination of the film of water on the ice and thereby an improvement of the ice-skid resistance, but in this case the strength of the rubber ends up falling. According to the present invention, however, this phenomenon does not arise due to the existence of the specific block copolymer in the foam compound and it is possible to further improve the ice-skid resistance while maintaining the strength of the rubber, for example, the tear strength, as is. As such a foaming agent, for example, ammonium bicarbonate, sodium bicarbonate, N,N'-dinitrosopentamethylenetetramine, N,N'-dimethyl-N,N'-dinitrosoterephthalamide, azodicarbonamide, azobisisobutylonitrile, benzenesulfonyl hydrazide, p,p'-oxybis(benzenesulfonylhydrazide), etc. may be used.

According to a preferred embodiment of the second aspect of the present invention, there is further provided a rubber composition comprised of a rubber composition into which is compounded staple fibers of an average length of 1 to 5000 µm, preferably 1 to 1000 µm, and an average aspect ratio of 10 to 1000, preferably 50 to 500, in an amount of 0.5 to 15 parts by weight, preferably 1 to 10 parts by weight, with respect to 100 parts by weight of the total of the rubber components (i), (ii), and (iii). The compounding of the staple fibers has the effect of roughening the surface of the rubber formulation, eliminating the film of water, and enhancing the block rigidity and also causes an improvement in the ice-skid resistance, but causes a reduction in the tear strength of the rubber formulation. According to the present invention, however, due to the existence of a specified block copolymer in the rubber formulation, no reduction of the tear strength occurs and it is possible to obtain a desired rubber composition for a tire tread with the added effect of the compounding of the staple fibers. As the staple fibers, for example, a cellulose fiber, protein fiber, polyamide fiber, polyester fiber, acrylic fiber, polyolefin fiber, glass fiber, carbon fiber, inorganic whiskers, PBO fiber, etc. may be used.

According to a preferred embodiment of the second aspect of the present invention, there is further provided a rubber composition comprised of a rubber composition into which is compounded a vulcanized rubber composition of an average particle size of not more than 2 mm, preferably 0.1 to 1.0 mm, in an amount of 1 to 20 parts by weight, preferably 2 to 15 parts by weight, with respect to 100 parts by weight of the total of the rubber components (i), (ii), and (iii). This vulcanized rubber powder preferably has a hardness lower than the matrix rubber, for example, and is preferable in that compounding of this low hardness vulcanized rubber powder enhances the adhesive friction with icy surfaces and as a result improves the ice-skid resistance. Just compounding this vulcanized rubber powder, however, is not preferable in that it causes a reduction of the breaking strength of the rubber formulation, but according to the present invention, the reduction of the tear strength is remarkably suppressed by the addition of the above specific block copolymer, so no reduction of the tear strength occurs and therefore it is possible to obtain a desired rubber composition for a tire tread having the added effects of compounding of a vulcanized rubber composition. As such a vulcanized rubber composition, for example, a carbon black-free vulcanate of a rubber such as a natural rubber, synthetic isoprene rubber, styrene-butadine copolymer rubber, polybutadiene rubber, etc. may be used.

According to the third aspect of the present invention, it is possible to enhance the abrasion resistance without causing a reduction in the viscoelastic properties such as the grip and possible to enhance the fatigue resistance and scratch resistance by compounding into a blend of (i) an NR and/or IR and (ii) a high cis-BR a (iii) specific block copolymer (A-B).

The NR, IR, and high cis-BR compounded in the rubber composition according to the present invention may be any polymers generally used as rubber components for various rubber applications in the past. The ratio of the blend of the NR/IR and the ratio of the blend of the (i) NR and/or IR/(ii) high cis-BR may be selected in accordance with the application of the rubber composition. The ratio may be suitably selected by a person skilled in the art, but preferably the NR/IR ratio may be made 100/0 to 50/50 and the (i) NR and/or IR/(ii) high cis-BR ratio may preferably be made 20 to 95/80 to 5 (parts by weight), more preferably 25 to 90/75 to 10 (parts by weight). Note that the cis-content of the high cis-BR used in the present invention is preferably at least 80% by weight, more preferably 90 to 100% by weight.

According to the third embodiment of the present invention, the above object of the invention can be achieved by compounding a specific A-B block copolymer into the above blend. If the amount of compounding of the A-B type block copolymer is too small, the desired effect of improvement such as the enhancement of the abrasion resistance is not obtained, while conversely if too great, the viscoelastic properties of the block polymer itself end up appearing, so the viscoelastic properties originally expected from the NR/high cis-BR blend, for example, the grip and the fuel economy, are lost. From this viewpoint, the A-B type block copolymer used in the present invention is compounded in an amount of 2 to 20 parts by weight, preferably 5 to 18 parts by weight of the A-B type block copolymer with respect to 100 parts by weight of all of the polymer components (including also the A-B type block copolymer).

The A-B type block copolymer used in the third aspect of the present invention is comprised of two types of styrene (St) and butadiene (Bd) copolymers (or a butadiene (Bd) polymer) having different vinyl contents (Vn) and has a styrene content (St) and a 1,2-vinyl bond content (Vn) of the block components A and B and a weight ratio (A)/(B) of the component A and the component B as follows:

Block A

A poly(styrene-butadiene) or polybutadiene with a styrene content of 0 to 35% by weight, preferably 5 to 35% by weight, more preferably 10 to 35% by weight (with the balance being butadiene content), a 1,2-vinyl bond content (Vn) of the butadiene portion of 5 to 80 molar %, preferably 10 to 70 molar % and $Vn \leq 2St+30$ (St: styrene content)

Block B

A poly(styrene-butadiene) or polybutadiene with a styrene content of 0 to 30% by weight, preferably 5 to 30% by weight, more preferably 10 to 30% by weight (with the balance being butadiene content) and a 1,2-vinyl bond content (Vn) of Vn>2St+30 (St: styrene content)

(A)/(B)=20 to 80/80 to 20 (parts by weight), preferably 30 to 70/70 to 30 (parts by weight)

If the styrene content of the block component (A) is too large, there is incompatibility with the high cis-BR, so the desired effect is no longer obtained. If the 1,2-vinyl bond content is outside the above range, the compatibility with the high cis-BR becomes poor, so the desired effect is not obtained. If the styrene content and the 1,2-vinyl bond content of the block component (B) are outside of the above predetermined ranges, the compatibility with natural rubber (and/or polyisoprene) becomes poor and the desired effect is not obtained. Further, if the ratio (A)/(B) is outside the above range, the entanglement of the matrix rubbers (NR, BR) becomes smaller or the cross-likability falls, so the desired effect can no longer be obtained.

The A-B type block copolymer used in the present invention is a known polymer. In general, the block (A) is produced by causing polymerization of for example a styrene and butadiene or a butadiene in an organic solvent such as hexane using an organic alkali metal compound catalyst such as butyllithium, while the block (B) is produced by further adding to this block in the end-living state a styrene and butadiene or a butadiene, so it is possible to obtain the desired block copolymer by suitably selecting the weight ratio of compounding of the monomers, the addition of a vinylation agent, the polymerization conditions, etc. at that time. Further, coupling between A-B block polymers through stannous tetrachloride, silicon tetrachloride, etc. is also possible. As another method, it is possible to produce the block A and the block B by ordinary methods and then cause these to couple using for example a coupling agent such as stannous tetrachloride or silicon tetrachloride. Note that the A-B type block copolymer may be end-modified by a modifier such as, for example, a ring amine, a compound having the following bond:

wherein M represents an oxygen atom or sulfur atom, for example, an amide compound, imide compound, lactam compound, urea compound, etc. and that the end-modified block may be produced by adding a suitable modifier in the living state after the completion of the copolymerization of the A-B type block copolymer.

The molecular weight of the A-B type block copolymer compounded of the present invention is not particularly limited, but considering the entanglement or cross-likability with the matrix rubbers, the weight average molecular weight is preferably at least 30,000, more preferably 50,000 to 800,000.

According to the fourth aspect of the present invention, it is possible to enhance the abrasion resistance without causing a reduction in the viscoelastic properties such as the grip and fuel economy and possible to enhance the fatigue resistance and scratch resistance by compounding into a blend of (i) an NR and/or IR and (ii) a high cis-BR a (iii) specific block copolymer (A-B).

The NR, IR, and high cis-BR compounded in the rubber composition according to the fourth aspect of the present invention may be any polymers generally used as rubber components for various rubber applications in the past. The ratio of the blend of the NR/IR and the ratio of the blend of the (i) NR and/or IR/(ii) high cis-BR may be selected in accordance with the application of the rubber composition.

The ratio may be suitably selected by a person skilled in the art, but preferably the NR/IR ratio may be made 100/0 to 50/50 and the (i) NR and/or IR/(ii) high cis-BR ratio may preferably be made 20 to 95/80 to 5 (parts by weight), more preferably 25 to 90/75 to 10 (parts by weight). Note that the cis-content of the high cis-BR used in the present invention is preferably at least 80% by weight, more preferably 90 to 100% by weight.

According to the fourth aspect of the present invention, the above object of the invention can be achieved by compounding a specific A-B block copolymer into the above blend. If the amount of compounding of the A-B type block copolymer is too small, the desired effect of improvement is not obtained, while conversely if too large, the viscoelastic properties of the block polymer is adversely affected, so the viscoelastic properties originally expected from the NR/high cis-BR blend, for example, the grip and the fuel economy, are lost. From this viewpoint, the A-B type block copolymer used in the present invention is compounded in an amount of 2 to 20 parts by weight, preferably 5 to 18 parts by weight of the A-B type block copolymer with respect to 100 parts by weight of all of the polymer components (including also the A-B type block copolymer).

The A-B type block copolymer used in the present invention is comprised of a styrene (St) and butadiene (Bd) copolymer or a butadiene (Bd) polymer and isoprene and has a styrene content (St) of the block components A and B, a 1,2-vinyl bond content (Vn), a cis-isoprene content, and a weight ratio (A)/(B) of the component A and the component B as follows:

Block A (a) A poly(styrene-butadiene) with a styrene content of not more than 35% by weight, preferably 1 to 35% by weight, more preferably 5 to 30% by weight (with the balance being butadiene content), a 1,2-vinyl bond content (Vn) of the butadiene portion of 5 to 80 molar %, preferably 10 to 70 molar % and Vn≦2St+30 (St: styrene content)

(b) A polybutadiene with a 1,2-vinyl bond content of more than 10 molar % but not more than 80 molar %, preferably 12 to 30 molar %

Block B

A polyisoprene with a cis-content of not less than 70% by weight, preferably not less than 75% by weight (A)/(B)=20 to 80/80 to 20 (parts by weight), preferably 30 to 70/70 to 30 (parts by weight)

If the styrene content of the block component (A) (a) is too large, there is incompatibility with the high cis-BR, so the desired effect is no longer obtained. If the 1,2-vinyl bond content is outside the above range, the compatibility with the high cis-BR becomes poor, so the desired effect is not obtained. If the amount of compounding of the A-B type block copolymer is less than 2 parts by weight, the physical properties such as the abrasion resistance fail to be improved, while conversely if over 20 parts by weight, the viscoelastic properties of the block copolymer itself appear, so there is an effect on the other physical properties. Further, if the ratio (A)/(B) is outside the above range, the entanglement of the matrix rubbers (NR, BR) becomes smaller or the cross-likability falls, so the desired effect can no longer be obtained.

The A-B type block copolymer used in the present invention is a known polymer. In general, the block (A) is produced by causing polymerization of for example a styrene and butadiene or a butadiene in an organic solvent such as hexane using an organic alkali metal compound catalyst such as butyllithium, while the block (B) is produced by further adding to this block in the end-living state an isoprene, so it is possible to obtain the desired block copolymer by suitably selecting the weight ratio of compounding of the monomers, the addition of a vinylation agent, the polymerization conditions, etc. at that time. Further, coupling between A-B block polymers through stannous tetrachloride, silicon tetrachloride, etc. is also possible. As another method, it is possible to produce the block A and the block B by ordinary methods and then cause these to couple using for example a coupling agent such as stannous tetrachloride or silicon tetrachloride. Note that the A-B type block copolymer may be end-modified by a modifier such as, for example, a ring amine, a compound having the following bond:

wherein M represents an oxygen atom or sulfur atom, for example, an amide compound, imide compound, lactam compound, urea compound, etc. and that the end-modified block may be produced by adding a suitable modifier in the living state after the completion of the copolymerization of the A-B type block copolymer.

The molecular weight of the A-B type block copolymer compounded in the present invention is not particularly limited, but considering the entanglement or cross-likability with the matrix rubbers (NR, high cis-BR), the weight average molecular weight is preferably at least 30,000, more preferably 50,000 to 800,000.

The rubber composition of the present invention may further have optionally compounded, 10 to 100 parts by weight of carbon black, preferably 20 to 90 parts by weight, and/or 10 to 100 parts by weight of silica, preferably 20 to 90 parts by weight, with respect to 100 parts by weight of the rubber components. The carbon black and silica may be any carbon black which has generally been compounded in rubber compositions in the past.

According to the fifth aspect of the present invention, by compounding into a rubber blend of (i) an SBR with a Tg of not less than −40° C. and (ii) an SBR and/or BR which is incompatible with this SBR (that is, the temperature distribution curve of the tanδ becomes bimodal or phase separation can be observed by observation through a transmission type electron microscope) and which has a Tg at least 10° C. lower, a specific block copolymer of a block A comprising an SBR or IR which is compatible with the SBR of the component (i) and incompatible with the SBR and/or BR of the component (ii) and a block B comprising an SBR or BR which is compatible with the SBR and/or BR of the component (ii) and incompatible with the SBR of the component (i), in an amount of 1 to 20 parts by weight with respect to 100 parts by weight of the total of the components (i), (ii), and (iii), it is possible to enhance the abrasion resistance without causing any substantial changes in the viscoelastic properties etc. The SBR of (i) or the SBR and BR of (ii) may be mixtures of two or more types of mutually compatible rubbers. In this case, the Tg of the (i) and (ii) is the Tg of the mixture.

The SBR compounded in the rubber composition of the present invention as the component (i) may be any SBR generally used for various rubber applications in the past and having a Tg of at least −40° C., preferably −35° to 0° C.

The SBR or BR compounded in the rubber composition according to the fifth aspect of the present invention as the component (ii) may, as above, be any SBR and/or BR generally used as a rubber component for various rubber applications in the past so long as it is incompatible with the rubber component comprised of the SBR of the component (i) and has a Tg lower by at least 10° C. from the TG of the SBR of the component (i). The ratio of the blend of the component (i)/component (ii) may be selected in accordance with the performance required of the rubber composition etc. This can be suitably selected by a person skilled in the art, but preferably the ratio of the component (i)/component (ii) may be made 90/10 to 10/90 by weight ratio.

According to the fifth aspect of the present invention, it is possible to achieve the object of the present invention by compounding a specific block copolymer into the above blend system. If the amount of compounding of the block copolymer is too large, the viscoelastic properties of the block polymers themselves end up appearing, so the viscoelastic properties such as the grip and fuel economy, which are physical properties of the rubber blend of the components (i) and (ii), are lost. Conversely, if too small, the desired effect of improvement becomes smaller. From this viewpoint, the block copolymer used in the present invention is compounded in an amount of 1 to 20 parts by weight, preferably 3 to 18 parts by weight, more preferably 3 to 15 parts by weight, with respect to 100 parts by weight of all of the polymer components (including also the type block copolymer).

The block copolymer used in the present invention, as mentioned above, is comprised of a block A of an SBR or IR which is compatible with the rubber component comprised of the SBR of the component (i) and incompatible with the rubber component comprised of the SBR or BR of the component (ii) and a block B of an SBR or BR which is compatible with the rubber component comprised of the SBR or BR of the component (ii) and incompatible with the rubber component comprised of the SBR of the component (i). Here, "compatible" and "incompatible" are defined as follows, that is, a blend of a 50/50 ratio of the copolymer comprising the block and the rubber component (i) or (ii) is prepared, the tanδ temperature distribution curve is measured, and a curve of a bimodal shape is considered "incompatible" and a curve of a monomodal shape is considered "compatible". There are cases, however, where while monomodal, a more microscope examination reveals incompatibility, so the Tg is confirmed by DSC and cases where two Tg's are observed are treated as "incompatible". Further, when it is not possible to make a judgement by the above method due to the Tg's of the polymers being close, it is necessary to examine if phase separation can be seen by observation through a transmission type electron microscope for example.

The block copolymer used in the present invention is a known polymer. In general, the block A is produced by causing polymerization of for example a styrene and butadiene or an isoprene in an organic solvent such as hexane using an organic alkali metal compound catalyst such as butyllithium, while the block B is produced by further adding to this block in the end-living state for example a styrene and butadiene or an isoprene, so it is possible to obtain the desired block copolymer by suitably selecting the weight ratio of compounding of the monomers, the polymerization conditions, etc. at that time. To suppress the adhesiveness, cold flow, etc. of the block polymers and facilitate industrial handling, the block polymers may be coupled by for example stannous tetrachloride, silicon tetrachloride, etc.

As another method, it is possible to produce the block A and the block B by ordinary methods and then cause these to couple using for example a coupling agent such as stannous tetrachloride or silicon tetrachloride. Note that the block copolymer may be end-modified by a modifier such as, for example, a ring amine, a compound having the bond:

wherein M represents an oxygen atom or a sulfur atom, for example, an amide compound, imide compound, lactam compound, urea compound, etc. and that the end-modified block may be produced by adding a suitable modifier in the living state after the completion of the copolymerization of the block copolymer.

The compositions of the components (i) and (ii) and the blocks A and B of the block copolymer added have to be such that there are the specific relationships of compatibility and incompatibility explained above, but A and B do not have to be of the same compositions as the components (i) and (ii). Certain ranges of the compositions of A and B are determined once the components (i) and (ii) are determined. To decide on these ranges, it is necessary to prepare a phase diagram by measuring the Tg's by tanδ temperature distribution DSC for various polymers for (i), (ii), and A and B, observing the phase separation structure by a transmission type electron microscope etc. It is important to decide on block polymer components A and B with a general applicability which are industrially easy to produce and which can be applied to other polymer blends.

According to the sixth aspect of the present invention, by compounding into (i) 80 to 99 parts by weight, preferably 82 to 95 parts by weight, of at least two types of incompatible diene rubbers A and B, (ii) 1 to 20 parts by weight, preferably 5 to 18 parts by weight, of a specific block copolymer (A'-B'), it is possible to enhance the abrasion resistance without causing any reduction in the properties such as the fuel economy and wet braking.

The diene rubbers A and B compounded in the rubber composition according to the present invention may be made any polymers generally used as rubber components for various rubber applications in the past, such as at least one type of diene rubber A of a polybutadiene rubber (BR) and styrene-butadiene copolymer rubber (SBR) with a styrene content (St) of 0 to 50% by weight and a 1,2-vinyl bond content of 5 to 85% and not more than (2St+30)% and a diene rubber B of a natural rubber (NR) and/or polyisoprene rubber (NR). Further, the weight ratio of 5 the diene rubbers A and B may be made A/B =10/90 to 90/10, preferably 20/80 to 80/20. Outside the range of these weight ratios, there is no meaning in blending the rubbers A and B.

According to the sixth aspect of the present invention, the above object of the invention can be achieved by compounding a specific A'-B' block copolymer into the above blend of the diene rubbers A and B. If the amount of compounding of the A'-B' type block copolymer is too small, the desired effect of improvement such as the enhancement of the abrasion resistance is not obtained, while conversely if too great, the viscoelastic properties of the block polymers themselves end up appearing, so the viscoelastic properties originally expected from the blend of the diene rubbers A and B, for example, the wet braking and the fuel economy, are lost. From this viewpoint, the A'-B' type block copolymer used in the present invention is compounded in an amount of 1 to 20 parts by weight, preferably 5 to 18 parts by weight of the A-B type block copolymer with respect to 100 parts by weight of all of the polymer components (including also the A-B type block copolymer).

The A'-B' type block copolymer used in the present invention is comprised of at least two block polymers with different compatibilities with the matrix rubber, that is, generally speaking, is a block copolymer comprised of a block A' which is compatible with the diene rubber A and incompatible with B and a block B' which is compatible with both of the diene rubbers A and B. A more specific example is given below:

It is possible to use combined with the above diene rubbers A and B a block copolymer including a block A' comprised of a poly(styrene-butadiene) or polybutadiene with a styrene content (St) of 0 to 50% by weight, preferably 0 to 48% by weight (with the balance being butadiene content) and a 1,2-vinyl bond content (Vn) of the butadiene portion of 5 to 80%, preferably 5 to 78%, and Vn≦2St+30 (St: styrene content) and a block B' comprised of a poly(styrene-butadiene) or polybutadiene with a styrene content (St) of 0 to 30% by weight, preferably 0 to 28% by weight (with the balance being butadiene content) and a 1,2-vinyl bond content (Vn) of Vn>2St+30 (St: styrene content) or an IR with a cis bond content of at least 70% by weight, preferably at least 80% by weight, in a ratio A'/B'=20/80 to 80/20 (parts by weight), preferably 30/70 to 70/30 (parts by weight).

When the diene rubber A is BR with a cis-1,4 bond content of at least 80%, it is possible to use as the block copolymer a combination at the above A'/B' ratio of a block A' comprised of a BR or SBR with a styrene content (St) of 0 to 35% by weight, preferably 0 to 33% by weight, and a 1,2-vinyl bond content (Vn) of 35 to 70%, preferably 38 to 68%, and Vn≦2St+30 and a block B' comprised of an SBR or BR with an St=0 to 30% by weight, preferably 0 to 28% by weight, and a Vn>2S+30 or an IR with a cis bond content of at least 70% by weight, preferably at least 80% by weight.

When the diene rubber A is a BR or SBR with an St of 0 to 55% by weight and a Vn of less than 35%, an St of 25 to 55% by weight and a Vn of 35 to 70%, or an St of 0 to 55% by weight and a Vn of more than 70% and the diene rubber B is a BR with a cis-1,4 bond content of at least 80%, it is possible to use a block copolymer A'-B' including the following block A' and block B' in the above weight ratio for example:

Block A' (SBR or BR)

St=0 to 55% by weight, Vn=less than 35%,

St=25 to 55% by weight, Vn=35 to 70%, or

St=0 to 55% by weight, Vn=over 70%

Block B' (SBR or BR)

St=0 to 30% by weight, Vn=35 to 70%

If the styrene content of the block component A' is too large, there is incompatibility with the diene rubber A, so the desired effect is no longer obtained. If the 1,2-vinyl bond content is outside the above range, the compatibility with the diene rubber A becomes poor, so the desired effect is not obtained. If the styrene content and the 1,2-vinyl bond content of the block component B' are outside of the above predetermined ranges, the compatibility with natural rubber (and/or polyisoprene) becomes poor and the desired effect is not obtained. Further, if the ratio A'/B' is outside the above range, the entanglement of the matrix rubbers becomes smaller or the cross-likability falls, so the desired effect can no longer be obtained. The A'-B' type block copolymer used in the sixth aspect of the present invention is a known polymer. In general, the block A' is produced by causing polymerization of for example a styrene and butadiene or a butadiene in an organic solvent such as hexane using an organic alkali metal compound catalyst such as butyllithium, while the block B' is produced by further adding to this block in the end-living state a styrene and butadiene or a butadiene, so it is possible to obtain the desired block copolymer by suitably selecting the weight ratio of compounding of the monomers, the addition of a vinylation agent, the polymerization conditions, etc. at that time. Further, coupling between A'-B' type block polymers through stannous tetrachloride, silicon tetrachloride, etc. is also possible. As another method, it is possible to produce the block A' and the block B' by ordinary methods and then cause these to couple using for example a coupling agent such as stannous tetrachloride or silicon tetrachloride. Note that the A'- B' type block copolymer may be end-modified by a modifier such as, for example, a ring amine, a compound having the following bond:

wherein M represents an oxygen atom or sulfur atom, for example, an amide compound, imide compound, lactam compound, urea compound, etc. and that the end-modified block may be produced by adding a suitable modifier in the living state after the completion of the copolymerization of the A'-B' type block copolymer.

The molecular weight of the A'-B' type block copolymer compounded in the present invention is not particularly limited, but considering the entanglement or cross-likability with the matrix rubbers (NR, high cis-BR), the weight average molecular weight is preferably at least 30,000, more preferably 50,000 to 800,000.

The rubber composition of the sixth aspect of the present invention may further have optionally compounded, based upon 100 parts by weight of the rubber component, at least 30 parts by weight of carbon black and/or silica and other reinforcing fillers, preferably 40 to 150 parts by weight. The carbon black and silica may be any which has generally been compounded in rubber compositions in the past.

In blending the rubber composition for a tire tread according to the present invention, it is essential to first mix the A'-B' block polymers, diene rubber B, and reinforcing fillers by an ordinary method, then blend the diene rubber A. Of course, separately compounding part of these components also falls in the technical scope of the present invention so long as it does not impair the object of the present invention.

According to the seventh aspect of the present invention, the abrasion resistance can be improved, without adversely affecting the viscoelastic properties such as grip characteristics and low fuel consumption by compounding (iii) the specified block copolymer (A-B) of the (A) the specified poly(styrene-butadiene) block or polybutadiene block and (B) the specified polyisoprene block to a blend of (i) NR and/or IR and (ii) the specified SBR.

The NR, IR, and SBR compounded in the rubber composition according to the seventh aspect of the present invention may be any polymers generally used as rubber components for various rubber applications in the past. The ratio of the blend of the NR/IR and the ratio of the blend of the (i) NR and/or IR/(ii) SBR may be selected in accordance with the application of the rubber composition. The ratio may be suitably selected by a person skilled in the art, but preferably the NR/IR ratio may be made 100/0 to 50/50 and the (i) NR and/or IR/(ii) SBR ratio may preferably be made 20 to 80/80 to 20 (parts by weight), more preferably 25 to 75/75 to 25 (parts by weight). Note that the SBR used in the seventh aspect of the present invention may be prepared by any conventional solution or emulsion polymerization method and preferably has a styrene content of 50% by weight or less, more preferably 45% by weight or less and a 1,2-vinyl content of the butadiene portion of 80 mol % or less, more preferably 5 to 80 mol % and satisfies the relationship of $Vn \leq 2St+30$.

According to the seventh aspect of the present invention, the above object of the invention can be achieved by compounding a specific A-B block copolymer into the above blend. If the amount of compounding of the A-B type block copolymer is too small, the desired effect of improvement is not obtained, while conversely if too large, the viscoelastic properties of the block polymer is adversely affected, so the viscoelastic properties originally expected from the NR/SBR blend, for example, the grip and the fuel economy, are lost. From this viewpoint, the A-B type block copolymer used in the present invention is compounded in an amount of 2 to 20 parts by weight, preferably 5 to 18 parts by weight of the A-B type block copolymer with respect to 100 parts by weight of all of the polymer components (including also the A-B type block copolymer).

The A-B type block copolymer used in the present invention is comprised of a styrene (St) and butadiene (Bd) copolymer or a butadiene (Bd) polymer and isoprene and has a styrene content (St) of the block components A and B, a 1,2-vinyl bond content (VN), a cis-isoprene content, and a weight ratio (A)/(B) of the component A and the component B as follows:

Block A (a) A poly(styrene-butadiene) with a styrene content of 50% by weight or less, preferably 1 to 45% by weight, more preferably 5 to 45% by weight (with the balance being butadiene content), a 1,2-vinyl bond content (Vn) of the butadiene portion of 5 to 30 molar %, preferably 10 to 30 molar % and $Vn \leq 2St+30$ (St: styrene content)

(b) A polybutadiene with a 1,2-vinyl bond content of 5 to 30 molar %, preferably 10 to 30 molar %

Block B

A polyisoprene with a cis-content of not less than 70% by weight, preferably not less than 75% by weight (A)/(B)=20 to 80/80 to 20 (parts by weight), preferably 30 to 70/70 to 30 (parts by weight)

If the styrene content of the block component (A) (a) is too large, there is incompatibility with the high cis-BR, so the desired effect is no longer obtained. If the 1,2-vinyl bond content is outside the above range, the compatibility with the high cis-BR becomes poor, so the desired effect is not obtained. If the amount of compounding of the A-B type block copolymer is less than 2 parts by weight, the action as a compatibilizing agent is insufficient and the physical properties such as the abrasion resistance fail to be improved, while conversely if over 20 parts by weight, the viscoelastic properties of the block copolymer itself appear, so there is an effect on the other physical properties. Further, if the ratio (A)/(B) is outside the above range, the entanglement of the matrix rubbers (NR, SBR) becomes smaller or the cross-likability falls, so the desired effect can no longer be obtained.

The A-B type block copolymer used in the present invention is a known polymer. In general, the block (A) is produced by causing polymerization of for example a styrene and butadiene or a butadiene in an organic solvent such as hexane using an organic alkali metal compound catalyst such as butyllithium, while the block (B) is produced by further adding to this block in the end-living state an isoprene, so it is possible to obtain the desired block copolymer by suitably selecting the weight ratio of compounding of the monomers, the addition of a vinylation agent, the polymerization conditions, etc. at that time. Further, coupling between A-B block polymers through stannous tetrachloride, silicon tetrachloride, etc. is also possible. As another method, it is possible to produce the block A and the block B by ordinary methods and then cause these to couple using for example a coupling agent such as stannous tetrachloride or silicon tetrachloride. Note that the A-B type block copolymer may be end-modified by a modifier such as, for example, a ring amine, a compound having the following bond:

wherein M represents an oxygen atom or sulfur atom, for example, an amide compound, imide compound, lactam compound, urea compound, etc. and that the end-modified block may be produced by adding a suitable modifier in the living state after the completion of the copolymerization of the A-B type block copolymer.

The molecular weight of the A-B type block copolymer compounded in the present invention is not particularly limited, but considering the entanglement or cross-likability with the matrix rubbers (NR, IR, SBR), the weight average molecular weight is preferably at least 30,000, more preferably 50,000 to 800,000.

The rubber composition of the present invention may further have optionally compounded, 10 to 100 parts by weight of carbon black, preferably 20 to 90 parts by weight, and/or 10 to 100 parts by weight of silica, preferably 20 to 90 parts by weight, with respect to 100 parts by weight of the rubber components. The carbon black and silica may be any carbon black which has generally been compounded in rubber compositions in the past.

The rubber composition of the present invention may further have optionally compounded, 10 to 100 parts by weight of carbon black, preferably 20 to 90 parts by weight, with respect to 100 parts by weight of the rubber components. The carbon black used here may be any carbon black which has generally been compounded in rubber compositions in the past.

The rubber composition of the present invention may have compounded, in addition to the above essential components and optional components, other additives generally compounded in rubber compositions for automobile tires such as sulfur, a vulcanization accelerator, an antioxidant, filler, softening agent, or plasticizer. The formulation may be vulcanized by a general method. The amount of compounding of these additives may be the generally compounded amounts. For example, the amount of compounding of sulfur is preferably at least 1.2 parts by weight per 100 parts by weight of the rubber components, more preferably 1.5 to 3.0 parts by weight. The vulcanization conditions are also of the general range.

EXAMPLES

The present invention will now be further illustrated in detail by, but is by no means limited to, the following Examples, wherein "parts" are all by weight unless otherwise noted.

Examples I-1 to I-16 and Comparative Examples I-1 to I-5

The physical properties evaluated in the following Examples and Comparative Examples were determined as follows.

1) Impact Resilience

The impact strength was measured according to JIS K6301.

2) Lambourn Abrasion Resistance Test

The Lambourn abrasion was measured using Lambourn abrasion test machine under the conditions shown in the Tables. The results were expressed by an index based upon the value in Comparative Examples 1-4 and 1-7 as 100.

3) Fatigue Life Index under Constant Strain

The compounds of Examples and Comparative Examples were vulcanized at 160° C. for 20 minutes and #3 dumbbell specimens according to JIS K6301 were prepared. The fatigue life was determined by measuring the repeated times at break when a constant stress of 100% is repeatedly applied. The test was carried out six times (i.e., n=6) in each sample and 50% retaining probability was determined from the normal probability distribution. The results were expressed by an index based upon the value in Comparative Example 7 as 100. The larger the index, the fatigue life is larger.

4) Anti External Damage Index

The compounds of Examples and Comparative Examples were vulcanized at 160° C. for 20 minutes and the vulcanizate sample having a thickness of about 6 cm was prepared. A steel needle was dropped from 15 cm height onto the sample under a load of 2 kg. The depth stucked by the needle was measured. The measurement was carried out five times (n=5) and the mean value was obtained. The results were expressed by an index based upon the value in Comparative Example 7 as 100. The larger the index, the external damage resistance is higher (namely, the depth stucked by the needle is shorter).

Ingredients shown in Tables I-1 and I-2 were compounded. The starting rubber and the compounding agent were mixed, except for a vulcanization accelerator and sulfur, by a 1.7 liter Bambuny mixer for 5 minutes, then the mixture was kneaded, together with the vulcanization accelerator and sulfur by an 8-inch test roll machine for 4 minutes to obtain the rubber composition. These rubber compositions were press vulcanized at 160° C. for 20 minutes to prepare the desired test pieces, which were then used for various test. The resultant physical properties of the vulcanizate are shown in Table I-1 and I-2.

TABLE I-1

| | (wt. part) | | | | | | | | | |
|---|---|---|---|---|---|---|---|---|---|---|
| | Comparative Example | | | | | Example | | | | |
| | I-1 | I-2 | I-3 | I-4 | I-5 | I-1 | I-2 | I-3 | I-4 | I-5 |
| NR | 100 | — | 70 | 50 | 30 | 49.5 | 47.5 | 45 | 42.5 | 49.5 |
| SBR (ST/VN = 25/35) | — | 100 | 30 | 50 | 70 | 49.5 | 47.5 | 45 | 42.5 | 49.5 |
| Block copolymer-I*1 | — | — | — | — | — | 1 | 5 | 10 | 15 | — |
| Block copolymer-II*2 | — | — | — | — | — | — | — | — | — | 1 |
| Block copolymer-III*3 | — | — | — | — | — | — | — | — | — | — |

TABLE I-1-continued

|  | (wt. part) | | | | | | | | | |
| --- | --- | --- | --- | --- | --- | --- | --- | --- | --- | --- |
|  | Comparative Example | | | | | Example | | | | |
|  | I-1 | I-2 | I-3 | I-4 | I-5 | I-1 | I-2 | I-3 | I-4 | I-5 |
| Aromatic oil | 5 | 5 | 5 | 5 | 5 | 5 | 5 | 5 | 5 | 5 |
| Carbon (N339) | 50 | 50 | 50 | 50 | 50 | 50 | 50 | 50 | 50 | 50 |
| Zinc oxide | 3 | 3 | 3 | 3 | 3 | 3 | 3 | 3 | 3 | 3 |
| Stearic acid | 1.5 | 1.5 | 1.5 | 1.5 | 1.5 | 1.5 | 1.5 | 1.5 | 1.5 | 1.5 |
| SANTOFLEX 13*[4] | 1 | 1 | 1 | 1 | 1 | 1 | 1 | 1 | 1 | 1 |
| Sulfur | 1.75 | 1.75 | 1.75 | 1.75 | 1.75 | 1.75 | 1.75 | 1.75 | 1.75 | 1.75 |
| Vulcanization accelerator (CZ) | 1 | 1 | 1 | 1 | 1 | 1 | 1 | 1 | 1 | 1 |
| Total | 163.25 | 163.25 | 163.25 | 163.25 | 163.25 | 163.25 | 163.25 | 163.25 | 163.25 | 163.25 |
| Impact resilience | | | | | | | | | | |
| 0° C. | 38 | 28 | 33 | 32 | 31 | 31 | 32 | 31 | 32 | 31 |
| 60° C. | 66 | 63 | 64 | 63 | 65 | 63 | 65 | 64 | 63 | 64 |
| Lambourn abrasion | | | | | | | | | | |
| Abrasion loss (cc) | 0.2009 | 0.2687 | 0.2449 | 0.2458 | 0.2423 | 0.2319 | 0.2356 | 0.2362 | 0.2292 | 0.2971 |
| Anti-abrasion index | 122 | 91 | 100 | 100 | 101 | 106 | 104 | 104 | 107 | 107 |

*[1]Block (A): ST/VN = 20/8, Block (B): ST/VN = 14/77, (A)/(B) ratio: 50/50
*[2]Block (A): ST/VN = 20/8, Block (B): ST/VN = 14/77, (A)/(B) ratio: 30/70 (Terminal ring amine modification)
*[3]Block (A): ST/VN = 20/8, Block (B): ST/VN = 14/77, (A)/(B) ratio: 30/70
*[4]1,3-Dimethylbutyl-p-phenylenediamine
*[5]Slip rate = 25%, Load = 5 kg, Time = 4 min, Temp. = Room temp., Grinder = K-80

TABLE I-2

| | (wt. part) Example | | | | | |
|---|---|---|---|---|---|---|
| | I-6 | I-7 | I-8 | I-9 | I-10 | I-11 |
| NR | 47.5 | 45 | 42.5 | 49.5 | 47.5 | 45 |
| SBR (ST/VN = 25/35) | 47.5 | 45 | 42.5 | 49.5 | 47.5 | 45 |
| Block copolymer-I[*1] | — | — | — | — | — | — |
| Block copolymer-II[*2] | 5 | 10 | 15 | — | — | — |
| Block copolymer-III[*3] | — | — | — | 1 | 3 | 10 |
| Aromatic oil | 5 | 5 | 5 | 5 | 5 | 5 |
| Carbon (N339) | 50 | 50 | 50 | 50 | 50 | 50 |
| Zinc oxide | 3 | 3 | 3 | 3 | 3 | 3 |
| Stearic acid | 1.5 | 1.5 | 1.5 | 1.5 | 1.5 | 1.5 |
| SANTOFLEX 13[*4] | 1 | 1 | 1 | 1 | 1 | 1 |
| Sulfur | 1.75 | 1.75 | 1.75 | 1.75 | 1.75 | 1.75 |
| Vulcanization accelerator (CZ) | 1 | 1 | 1 | 1 | 1 | 1 |
| Total | 163.25 | 163.25 | 163.25 | 163.25 | 163.25 | 163.25 |
| Impact resilience | | | | | | |
| 0° C. | 30 | 29 | 29 | 30 | 31 | 30 |
| 60° C. | 63 | 64 | 64 | 64 | 64 | 64 |
| Lambourn abrasion[*5] | | | | | | |
| Abrasion loss (cc) | 0.2234 | 0.2137 | 0.2362 | 0.2971 | 0.2218 | 0.2335 |
| Anti-abrasion index | 110 | 115 | 104 | 107 | 111 | 105 |

| | (wt. part) Example | | | | |
|---|---|---|---|---|---|
| | I-12 | I-13 | I-14 | I-15 | I-16 |
| NR | 42.5 | 63 | 27 | 66.5 | 28.5 |
| SBR (ST/VN = 25/35) | 42.5 | 27 | 63 | 28.5 | 66.5 |
| Block copolymer-I[*1] | — | — | — | — | — |
| Block copolymer-II[*2] | — | 10 | 10 | — | — |
| Block copolymer-III[*3] | 15 | — | — | 5 | 5 |
| Aromatic oil | 5 | 5 | 5 | 5 | 5 |
| Carbon (N339) | 50 | 50 | 50 | 50 | 50 |
| Zinc oxide | 3 | 3 | 3 | 3 | 3 |
| Stearic acid | 1.5 | 1.5 | 1.5 | 1.5 | 1.5 |
| SANTOFLEX 13[*4] | 1 | 1 | 1 | 1 | 1 |
| Sulfur | 1.75 | 1.75 | 1.75 | 1.75 | 1.75 |
| Vulcanization accelerator (CZ) | 1 | 1 | 1 | 1 | 1 |
| Total | 163.25 | 163.25 | 163.25 | 163.25 | 163.25 |
| Impact resilience | | | | | |
| 0° C. | 29 | 31 | 29 | 31 | 29 |
| 60° C. | 62 | 63 | 64 | 64 | 63 |
| Lambourn abrasion[*5] | | | | | |
| Abrasion loss (cc) | 0.2235 | 0.2415 | 0.2277 | 0.2296 | 0.2223 |
| Anti-abrasion index | 110 | 106 | 108 | 107 | 111 |

[*1]–[*5]: See Remarks in Table I-1

Examples I-17 to I-28 and Comparative Example I-6 to I-9

Ingredients shown in Tables I-3 and I-4 were compounded. The starting rubber and the compounding agent were mixed, except for a vulcanization accelerator and sulfur, by a 1.7 liter Bambury mixer for 5 minutes, then the mixture was kneaded, together with the vulcanization accelerator and sulfur by an 8-inch test kneading roll machine for 4 minutes to obtain the rubber composition. These rubber compositions were press vulcanized at 160° C. for 20 minutes to prepare the desired test pieces, which were then used for various test. The resultant physical properties of the vulcanizate are shown in Tables I-3 and I-4.

TABLE I-3

(wt. part)

| | Comparative Example | | | Example | | | | | | | | |
|---|---|---|---|---|---|---|---|---|---|---|---|---|
| | I-6 | I-7 | I-8 | I-17 | I-18 | I-19 | I-20 | I-21 | I-22 | I-23 | I-24 | I-25 |
| NR | 100 | 80 | 60 | 79.5 | 77.5 | 72.5 | 79.5 | 77.5 | 72.5 | 79.5 | 77.5 | 72.5 |
| BR (BR1220) | — | 20 | 40 | 19.5 | 17.5 | 12.5 | 19.5 | 17.5 | 12.5 | 19.5 | 17.5 | 12.5 |
| Block copolymer-IV*1 | — | — | — | 1 | 5 | 15 | — | — | — | — | — | — |
| Block copolymer-V*2 | — | — | — | — | — | — | 1 | 5 | 15 | — | — | — |
| Block copolymer-VI*3 | — | — | — | — | — | — | — | — | — | 1 | 5 | 15 |
| Aromatic oil | 15 | 15 | 15 | 15 | 15 | 15 | 15 | 15 | 15 | 15 | 15 | 15 |
| Carbon (N220) | 60 | 60 | 60 | 60 | 60 | 60 | 60 | 60 | 60 | 60 | 60 | 60 |
| Zinc oxide | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 |
| SANTOFLEX 13*4 | 1 | 1 | 1 | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 | 1.5 | 1.5 | 1.5 |
| Vulcanization accelerator (CZ) | 1 | 1 | 1 | 1 | 1 | 1 | 1 | 1 | 1 | 1 | 1 | 1 |
| Total | 183.5 | 183.5 | 183.5 | 183.5 | 183.5 | 183.5 | 183.5 | 183.5 | 183.5 | 183.5 | 183.5 | 183.5 |
| Fatigue life under constant stress (Stress rate = 100%) | 87 | 100 | 113 | 111 | 109 | 110 | 109 | 113 | 108 | 108 | 114 | 109 |
| Anti-external damage index | 114 | 100 | 92 | 109 | 108 | 110 | 110 | 111 | 110 | 108 | 109 | 113 |
| Lambourn abrasion*5 Anti-abrasion index | 92 | 100 | 110 | 117 | 112 | 109 | 115 | 116 | 109 | 111 | 109 | 109 |

*1: Block A: (ST/VN = 20/8), Block B: (ST/VN = 14/77), (A)/(B) ratio: (50/50)
*2: Block A: (ST/VN = 0/4), Block B: (ST/VN = 14/77), (A)/(B), ratio: (50/50)
*3: Block A: (ST/VN = 20/8), Block B: (ST/VN = 0/71), (A)/(B), ratio: (50/50)
*4: 1,3-Dimethylbutyl-p-phenylenediamine
*5: Slip rate = 25%, Load = 5 kg, Time = 4 min, Temp. = Room temp., Grinder = K-80

TABLE I-4

| | Comparative Example | Example | | |
|---|---|---|---|---|
| | I-9 | I-26 | I-27 | I-28 |
| NR | 40 | 39.5 | 37.5 | 32.5 |
| BR (BR1220) | 60 | 59.5 | 57.5 | 52.5 |
| Block copolymer-IV*1 | — | 1 | 5 | 15 |
| Block copolymer-V*2 | — | — | — | — |
| Block copolymer-VI*3 | — | — | — | — |
| Aromatic oil | 15 | 15 | 15 | 15 |
| Carbon (N220) | 60 | 60 | 60 | 60 |
| Zinc oxide | 3 | 3 | 3 | 3. |
| Stearic acid | 2 | 2 | 2 | 2 |
| SANTOFLEX 13*4 | 1 | 1 | 1 | 1 |
| Sulfur | 1.5 | 1.5 | 1.5 | 1.5 |
| Vulcanization accelerator (CZ) | 1 | 1 | 1 | 1 |
| Total | 183.5 | 183.5 | 183.5 | 183.5 |
| Fatique life under constant stress (Stress ratio = 100%) | 117 | 126 | 129 | 126 |
| Anti-external damage index | 84 | 93 | 97 | 96 |
| Lambourn abrasion*5 Anti-abrasion index | 122 | 129 | 130 | 128 |

*1–*5See Remarks of Table I-3

As is clear from the results shown above, according to the present invention, the abrasion resistance can be improved (good as the abrasion resistance indexes of Tables I-1 to I-4 are large) without decreasing the low heat generation (good as the impact resistance at 60° C. is higher) and without decreasing the grip characteristics (wet grip is good as the impact resistance at 0° C. is lower). Thus, rubber compositions having good abrasion resistance, and excellent fatigue life under constant stress and excellent external damage resistance (both good as the indexes are higher in Tables I-3 and I-4) can be obtained.

Examples II-1 to II-11 and Comparative Examples II-1 to II-11

1) The tear strength was measured by JIS K6301.

2) The ice-skid resistance was measured using a British skid tester and using an ice sheet (−2° C.) prepared using tap water as the road surface.

The components of each of the formulations (parts by weight) shown in Table II-1 and Table II-2 were mixed. The starting rubber, not including a vulcanization accelerator and sulfur, and compounding agents were mixed by a 1.7 liter Bambury mixer for 5 minutes, then the mixture was mixed together with the vulcanization accelerator and sulfur by an 8-inch test roll machine for 4 minutes to obtain the rubber composition. Each rubber composition was press vulcanized at 160° C. for 20 minutes to prepare the desired test pieces which were then subjected to various tests to evaluate their physical properties. The physical properties of the resultant vulcanates were as shown in Table II-1 and Table II-2.

TABLE II-1

| | Comp. Ex. II-1 | Comp. Ex. II-2 | Comp. Ex. II-3 | Comp. Ex. II-4 | Comp. Ex. II-5 | Comp. Ex. II-6 |
|---|---|---|---|---|---|---|
| NR(1 | 100 | 80 | 60 | 50 | 25 | — |
| BR(2 | — | 20 | 40 | 50 | 75 | 100 |
| Block copolymer 1(3 | — | — | — | — | — | — |
| Block copolymer 2(4 | — | — | — | — | — | — |
| Block copolymer 3(5 | — | — | — | — | — | — |
| Carbon black (N339) | 50 | 50 | 50 | 50 | 50 | 50 |
| Zinc oxide | 3 | 3 | 3 | 3 | 3 | 3 |
| Stearic acid | 1 | 1 | 1 | 1 | 1 | 1 |

TABLE II-1-continued

|  | Comp. Ex. II-1 | Comp. Ex. II-2 | Comp. Ex. II-3 | Comp. Ex. II-4 | Comp. Ex. II-5 | Comp. Ex. II-6 |
|---|---|---|---|---|---|---|
| Antioxidant[6] | 1 | 1 | 1 | 1 | 1 | 1 |
| Paraffinic oil | 15 | 15 | 15 | 15 | 15 | 15 |
| Sulfur | 2 | 2 | 2 | 2 | 2 | 2 |
| Vulcanization accelerator[7] | 1 | 1 | 1 | 1 | 1 | 1 |
| Ice skid resistance index | 90 | 97 | 100 | 101 | 103 | 108 |
| Tear strength (unit: kg/cm) Type = B, Speed = 500 mm/min JIS TRB | 80 | 80 | 73 | 81 | 64 | 61 |

[1]SMR20
[2]Nippol 1220 (made by Nihon Zeon)
[3]Block A (St/Vn = 20 wt %/8 mol %), block B (St/Vn = 14 wt %/77 mol %), (A)/(B) ratio = 50/50, weight average molecular weight = 85,000
[4]Block A (St/Vn = 20 wt %/8 mol %), block B (St/Vn = 14 wt %/77 mol %), (A)/(B) ratio = 50/50, weight average molecular weight = 310,000
[5]Block A (St/Vn = 20 wt %/8 mol %), block B (St/Vn = 14 wt %/77 mol %), Block A (St/Vn = 20 wt %/8 mol %), block B (St/Vn = 14 wt %/77 mol %), (A)/(B) ratio = 50/50, weight average molecular weight = 640,000
[6]Santoflex 13 (made by Monsanto Corporation)
[7]Santocure-NS (made by Monsanto Corporation)

TABLE II-1

|  | Ex. II-1 | Ex. II-2 | Ex. II-3 | Ex. II-4 | Ex. II-5 | Ex. II-6 |
|---|---|---|---|---|---|---|
| NR[1] | 57.5 | 55 | 57.5 | 55 | 57.5 | 55 |
| BR[2] | 37.5 | 35 | 37.5 | 35 | 37.5 | 35 |
| Block copolymer 1[3] | 5 | 10 | — | — | — | — |
| Block copolymer 2[4] | — | — | 5 | 10 | — | — |
| Block copolymer 3[5] | — | — | — | — | 5 | 10 |
| Carbon black (N339) | 50 | 50 | 50 | 50 | 50 | 50 |
| Zinc oxide | 3 | 3 | 3 | 3 | 3 | 3 |
| Stearic acid | 1 | 1 | 1 | 1 | 1 | 1 |
| Antioxidant[6] | 1 | 1 | 1 | 1 | 1 | 1 |
| Paraffinic oil | 15 | 15 | 15 | 15 | 15 | 15 |
| Sulfur | 2 | 2 | 2 | 2 | 2 | 2 |
| Vulcanization accelerator[7] | 1 | 1 | 1 | 1 | 1 | 1 |
| Ice skid resistance index | 100 | 101 | 100 | 100 | 101 | 101 |
| Tear strength (unit: kg/cm) Type = B, Speed = 500 mm/min JIS TRB | 83 | 77 | 78 | 79 | 77 | 77 |

[1]SMR20
[2]Nippol 1220 (made by Nihon Zeon)
[3]Block A (St/Vn = 20 wt %/8 mol %), block B (St/Vn = 14 wt %/77 mol %), (A)/(B) ratio = 50/50, weight average molecular weight = 85,000
[4]Block A (St/Vn = 20 wt %/8 mol %), block B (St/Vn = 14 wt %/77 mol %), (A)/(B) ratio = 50/50, weight average molecular weight = 310,000
[5]Block A (St/Vn = 20 wt %/8 mol %), block B (St/Vn = 14 wt %/77 mol %), Block A (St/Vn = 20 wt %/8 mol %), block B (St/Vn = 14 wt %/77 mol %), (A)/(B) ratio = 50/50, weight average molecular weight = 640,000
[6]Santoflex 13 (made by Monsanto Corporation)
[7]Santocure-NS (made by Monsanto Corporation)

As clear from the results given in Table II-1, Comparative Examples II-1 to II-6 show the physical properties obtained when changing the NR/BR ratio. If the NR ratio is increased, the ice-skid resistance falls, while if the BR ratio is increased, the tear strength ends up falling and becomes insufficient for a studless tire. As opposed to this, Examples II-1 to II-6 show compositions based on a formulation of NR/BR of 60/40 with the addition of block polymers. Compared with Comparative Example II-3, the tear strength is improved while the ice-skid resistance is maintained the same.

TABLE II-2

|  | Comp. Ex. II-7 | Comp. Ex. II-8 | Comp. Ex. II-9 | Comp. Ex. II-10 | Comp. Ex. II-11 | Ex. II-7 | Ex. II-8 | Ex. II-9 | Ex. II-10 | Ex. II-11 |
|---|---|---|---|---|---|---|---|---|---|---|
| NR[1] | 60 | 60 | 60 | 60 | 60 | 55 | 55 | 55 | 55 | 55 |
| BR[2] | 40 | 40 | 40 | 40 | 40 | 35 | 35 | 35 | 35 | 35 |
| Block copolymer 1[3] | — | — | — | — | — | — | — | — | — | — |
| Block copolymer 2[4] | — | — | — | — | — | — | — | — | — | 10 |
| Block copolymer 3[5] | — | — | — | — | — | 10 | 10 | 10 | 10 | — |
| Stable fiber[8] | — | — | 5 | — | 5 | — | 5 | — | 5 | 5 |
| Vulcanized rubber powder[9] | — | — | — | 3 | 3 | — | — | 3 | 3 | 3 |
| Carbon black | 50 | 50 | 50 | 50 | 50 | 50 | 50 | 50 | 50 | 50 |
| Zinc oxide | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Antioxidant[6] | 1 | 1 | 1 | 1 | 1 | 1 | 1 | 1 | 1 | 1 |
| Aromatic oil | 15 | 15 | 15 | 15 | 15 | 15 | 15 | 15 | 15 | 15 |
| Foaming agent[10] | — | 2 | — | — | 2 | 2 | — | — | 2 | 2 |
| Ureic assistant[11] | — | 1 | — | — | 1 | 1 | — | — | 1 | 1 |
| Sulfur | 2 | 2 | 2 | 2 | 2 | 2 | 2 | 2 | 2 | 2 |
| Vulcanization accelerator[7] | 1 | 1 | 1 | 1 | 1 | 1 | 1 | 1 | 1 | 1 |

TABLE II-2-continued

| | Comp. Ex. II-7 | Comp. Ex. II-8 | Comp. Ex. II-9 | Comp. Ex. II-10 | Comp. Ex. II-11 | Ex. II-7 | Ex. II-8 | Ex. II-9 | Ex. II-10 | Ex. II-11 |
|---|---|---|---|---|---|---|---|---|---|---|
| Ice skid resistance index | 100 | 103 | 102 | 104 | 106 | 104 | 102 | 103 | 105 | 106 |
| Tear strength (unit: kg/cm) Type = B, Speed = 500 mm/min JIS TRB | 75 | 70 | 72 | 71 | 69 | 76 | 76 | 76 | 74 | 74 |

(1)SMR20
(2)Nippol 1220 (made by Nihon Zeon)
(3)Block A (St/Vn = 20 wt %/8 mol %), block B (St/Vn = 14 wt %/77 mol %), (A)/(B) ratio = 50/50, weight average molecular weight = 85,000
(4)Block A (St/Vn = 20 wt %/8 mol %), block B (St/Vn = 14 wt %/77 mol %), (A)/(B) ratio = 50/50, weight average molecular weight = 310,000
(5)Block A (St/Vn = 20 wt %/8 mol %), block B (St/Vn = 14 wt %/77 mol %), (A)/(B) ratio = 50/50, weight average molecular weight = 640,000
(6)Santoflex 13 (made by Monsanto Corporation)
(7)Santocure-NS (made by Monsanto Corporation)
(8)γ-aminopropyltrimethoxysilane treated nylon staple fiber: average length = 30 μm, average diameter = 0.3 μm.
(9)Vulcanized rubber of natural rubber pure rubber formulation: average particle size = 200 μm.
(10)Dinitrosopentamethylenetetramine (Cellar D: made by Eiwa Kasei Kogyosha)
(11)Uric acid-based assistant (Cellpaste K5: made by Eiwa Kagei Kogyosha)

As clear from the results given in Table II-2, Comparative Examples II-7 to II-11 exhibited an effective improvement of the tear strength by compounding staple fibers, compounding a vulcanized rubber powder, compounding a foaming agent, and adding a block polymer to combined systems of the same. From this it is learned that in the same way as in the case of Table II-1, the compounds including block polymers shown in Examples II-7 to II-11 were improved in tear strength while maintaining 10 their ice-skid resistance.

As explained above, according to the present invention, it is possible to obtain a rubber composition remarkably improved in ice-skid resistance without causing a reduction of the tear strength.

Example III-1 to III-10 and Comparative Examples III-1 to III-9

1) Viscoelastic Properties

These were measured using a viscoelastic spectrometer made by Toyo Seiki Seisakusho at a static strain of 10%, a dynamic strain of ±2%, and a frequency of 20 Hz (test sample width of 5 mm, −20° C., 0° C., 60° C.)

Abrasion Resistance Test

This was measured using a Lambourn abrasion tester under conditions of a slip rate of 25% and a weight of 5 kg. The results were expressed by an index based on the rubber of the standard Example of Comparative Example III-3 as 100 (abrasion resistance index). The larger the value, the better the abrasion resistance.

The components of each of the formulations (parts by weight) shown in Table III-1 were compounded. The starting rubber, except for a vulcanization accelerator and sulfur, and compounding agents were mixed by a 1.7 liter Bambury mixer for 5 minutes, then the mixture was mixed together with the vulcanization accelerator and sulfur by an 8-inch test roll machine for 4 minutes to obtain the rubber composition. Each rubber composition was press vulcanized at 160° C. for 20 minutes to prepare the desired test pieces which were then subjected to various tests to determine their physical properties. The physical properties of the resultant vulcanates were as shown in Table III-1.

TABLE III-1

|  | Ex. III-1 | Ex. III-2 | Ex. III-3 | Ex. III-4 | Ex. III-5 | Ex. III-6 | Ex. III-7 | Ex. III-8 | Ex. III-9 | Ex. III-10 |
|---|---|---|---|---|---|---|---|---|---|---|
| Natural rubber*1 | 46.5 | 42.5 | 46.5 | 42.5 | 46.5 | 42.5 | 46.5 | 42.5 | 46.5 | 42.5 |
| High cis-BR*2 | 46.5 | 42.5 | 46.5 | 42.5 | 46.5 | 42.5 | 46.5 | 42.5 | 46.5 | 42.5 |
| Block copolymer 1*3 | 7 | 15 | — | — | — | — | — | — | — | — |
| Block copolymer 2*4 | — | — | 7 | 15 | — | — | — | — | — | 10 |
| Block copolymer 3*5 | — | — | — | — | 7 | 15 | — | — | — | — |
| Block copolymer 4*6 | — | — | — | — | — | — | 7 | 15 | — | — |
| Block copolymer 5*7 | — | — | — | — | — | — | — | — | 7 | 15 |
| Block copolymer 6*8 | — | — | — | — | — | — | — | — | — | — |
| Block copolymer 7*9 | — | — | — | — | — | — | — | — | — | — |
| Carbon black*10 | 50 | 50 | 50 | 50 | 50 | 50 | 50 | 50 | 50 | 50 |
| Zinc oxide | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Antioxidant*11 | 1 | 1 | 1 | 1 | 1 | 1 | 1 | 1 | 1 | 1 |
| Sulfur | 2 | 2 | 2 | 2 | 2 | 2 | 2 | 2 | 2 | 2 |
| Vulcanization accelerator*12 | 1 | 1 | 1 | 1 | 1 | 1 | 1 | 1 | 1 | 1 |
| Total (PHR) | 158 | 158 | 158 | 158 | 158 | 158 | 158 | 158 | 158 | 158 |
| viscoelastic properties tanδ |  |  |  |  |  |  |  |  |  |  |
| −20° C. | 0.290 | 0.312 | 0.297 | 0.302 | 0.302 | 0.313 | 0.289 | 0.301 | 0.272 | 0.267 |
| 0° C. | 0.189 | 0.214 | 0.204 | 0.201 | 0.205 | 0.206 | 0.195 | 0.201 | 0.190 | 0.187 |
| 60° C. | 0.127 | 0.139 | 0.132 | 0.128 | 0.137 | 0.127 | 0.128 | 0.131 | 0.128 | 0.124 |
| E' (MPa) |  |  |  |  |  |  |  |  |  |  |
| −20° C. | 9.08 | 10.64 | 10.05 | 9.83 | 9.69 | 10.74 | 9.50 | 10.49 | 9.35 | 8.89 |
| 0° C. | 7.22 | 8.35 | 8.07 | 7.80 | 7.73 | 8.42 | 7.68 | 7.99 | 7.65 | 7.53 |
| 60° C. | 6.45 | 6.51 | 6.64 | 6.41 | 6.49 | 6.89 | 6.63 | 6.73 | 6.90 | 6.31 |
| Abrasion resistance index | 104 | 108 | 104 | 107 | 107 | 109 | 109 | 109 | 104 | 105 |

|  | Comp. Ex. III-1 | Comp. Ex. III-2 | Comp. Ex. III-3*13 | Comp. Ex. III-4 | Comp. Ex. III-5 | Comp. Ex. III-6 | Comp. Ex. III-7 |
|---|---|---|---|---|---|---|---|
| Natural rubber*1 | 100 | 75 | 50 | 25 | — | 42.5 | 42.5 |
| High cis-BR*2 | — | 25 | 50 | 75 | 100 | 42.5 | 42.5 |
| Block copolymer 1*3 | — | — | — | — | — | — | — |
| Block copolymer 2*4 | — | — | — | — | — | — | — |
| Block copolymer 3*5 | — | — | — | — | — | — | — |
| Block copolymer 4*6 | — | — | — | — | — | — | — |
| Block copolymer 5*7 | — | — | — | — | — | — | — |
| Block copolymer 6*8 | — | — | — | — | — | 15 | — |
| Block copolymer 7*9 | — | — | — | — | — | — | 15 |
| Carbon black*10 | 50 | 50 | 50 | 50 | 50 | 50 | 50 |
| Zinc oxide | 3 | 3 | 3 | 3 | 3 | 3 | 3 |
| Stearic acid | 1 | 1 | 1 | 1 | 1 | 1 | 1 |
| Antioxidant*11 | 1 | 1 | 1 | 1 | 1 | 1 | 1 |
| Sulfur | 2 | 2 | 2 | 2 | 2 | 2 | 2 |
| Vulcanization accelerator*12 | 1 | 1 | 1 | 1 | 1 | 1 | 1 |
| Total (PHR) | 158 | 158 | 158 | 158 | 158 | 158 | 158 |
| viscoelastic properties tanδ |  |  |  |  |  |  |  |
| −20° C. | 0.508 | 0.356 | 0.273 | 0.210 | 0.175 | 0.287 | 0.285 |
| 0° C. | 0.262 | 0.211 | 0.183 | 0.165 | 0.162 | 0.189 | 0.195 |
| 60° C. | 0.141 | 0.134 | 0.125 | 0.116 | 0.127 | 0.124 | 0.127 |
| E' (MPa) |  |  |  |  |  |  |  |
| −20° C. | 12.19 | 11.12 | 10.05 | 8.64 | 9.01 | 9.90 | 9.70 |
| 0° C. | 7.96 | 8.62 | 8.00 | 7.31 | 7.60 | 7.60 | 7.67 |
| 60° C. | 6.55 | 6.99 | 7.07 | 6.40 | 7.28 | 6.40 | 7.01 |
| Abrasion resistance index | 73 | 83 | 100 | 143 | 185 | 98 | 97 |

*1 TTR-20
*2 Nipol BR1220 (made by Nihon Zeon)
*3–*9 Block copolymers (see Table III-2)
*10 Sheast 6 (made by Tokai Carbon Co.)
*11 Santoflex 13 (made by Monsanto Corporation)
*12 Santocure NS (made by Monsanto Corporation)
*13 Standard example As explained above, according to the present invention, it is possible to obtain a rubber composition superior in the abrasion resistance (the larger the abrasion resistance index in Table III-1, the better) (in Table III-1, the higher the index, the better) without causing a reduction in the grip (the higher the tanδ at 0° C. the better the wet grip) and the flexibility at low temperatures (the smaller the E' at −20° C. the better).

Examples IV-1 to IV-10 and Comparative Examples IV-1 to IV-9

1) Viscoelastic Properties

These were measured using a viscoelastic spectrometer made by Toyo Seiki Seisakusho at a static strain of 10%, a dynamic strain of ±2%, and a frequency of 20 Hz (test sample width of 5 mm, −20° C., 0° C., 60° C.)

Abrasion Resistance Test

This was measured using a Lambourn abrasion tester under conditions of a slip rate of 25% and a weight of 5 kg. The results were expressed by an index based on the rubber of the standard Example of Comparative Example IV-3 as 100 (abrasion resistance index). The larger the value, the better the abrasion resistance.

The components of each of the formulations (parts by weight) shown in Table IV-1 were compounded. The starting rubber, except for a vulcanization accelerator and sulfur, and compounding agents were mixed by a 1.7 liter Bambury mixer for 5 minutes, then the mixture was mixed together with the vulcanization accelerator and sulfur by an 8-inch test roll machine for 4 minutes to obtain the rubber composition. Each rubber composition was press vulcanized at 160° C. for 20 minutes to prepare the desired test pieces which were then subjected to various tests to determine their physical properties. The physical properties of the resultant vulcanates were as shown in Table IV-1.

TABLE IV-1

| | Ex. IV-1 | Ex. IV-2 | Ex. IV-3 | Ex. IV-4 | Ex. IV-5 | Ex. IV-6 | Ex. IV-7 | Ex. IV-8 | Ex. IV-9 | Ex. IV-10 |
|---|---|---|---|---|---|---|---|---|---|---|
| Natural rubber*[1] | 46.5 | 42.5 | 46.5 | 42.5 | 46.5 | 42.5 | 46.5 | 42.5 | 46.5 | 42.5 |
| High cis-BR*[2] | 46.5 | 42.5 | 46.5 | 42.5 | 46.5 | 42.5 | 46.5 | 42.5 | 46.5 | 42.5 |
| Block copolymer 1*[3] | 7 | 15 | — | — | — | — | — | — | — | — |
| Block copolymer 2*[4] | — | — | 7 | 15 | — | — | — | — | — | — |
| Block copolymer 3*[5] | — | — | — | — | 7 | 15 | — | — | — | — |
| Block copolymer 4*[6] | — | — | — | — | — | — | 7 | 15 | — | — |
| Block copolymer 5*[7] | — | — | — | — | — | — | — | — | — | — |
| Block copolymer 6*[8] | — | — | — | — | — | — | — | — | — | — |
| Block copolymer 7*[9] | — | — | — | — | — | — | — | — | — | — |
| Block copolymer 8*[10] | — | — | — | — | — | — | — | — | 7 | 15 |
| Carbon black*[11] | 50 | 50 | 50 | 50 | 50 | 50 | 50 | 50 | 50 | 50 |
| Zinc oxide | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Antioxidant*[12] | 1 | 1 | 1 | 1 | 1 | 1 | 1 | 1 | 1 | 1 |
| Sulfur | 2 | 2 | 2 | 2 | 2 | 2 | 2 | 2 | 2 | 2 |
| Vulcanization accelerator*[13] | 1 | 1 | 1 | 1 | 1 | 1 | 1 | 1 | 1 | 1 |
| Total (PHR) | 158 | 158 | 158 | 158 | 158 | 158 | 158 | 158 | 158 | 158 |
| viscoelastic properties | | | | | | | | | | |
| tanδ | | | | | | | | | | |
| −20° C. | 0.276 | 0.273 | 0.277 | 0.274 | 0.274 | 0.275 | 0.276 | 0.274 | 0.272 | 0.270 |
| 0° C. | 0.184 | 0.183 | 0.185 | 0.185 | 0.184 | 0.182 | 0.183 | 0.184 | 0.181 | 0.180 |
| 60° C. | 0.126 | 0.126 | 0.126 | 0.128 | 0.127 | 0.126 | 0.124 | 0.127 | 0.124 | 0.124 |
| E' (MPa) | | | | | | | | | | |
| −20° C. | 10.05 | 10.07 | 10.6 | 10.05 | 10.07 | 10.02 | 10.03 | 10.04 | 10.00 | 9.97 |
| 0° C. | 7.96 | 8.03 | 8.02 | 8.00 | 7.98 | 7.97 | 8.04 | 8.01 | 7.89 | 7.88 |
| 60° C. | 6.97 | 7.05 | 6.99 | 7.03 | 7.00 | 7.01 | 7.07 | 7.04 | 7.04 | 7.00 |
| Abrasion resistance index | 106 | 108 | 108 | 113 | 106 | 107 | 107 | 109 | 106 | 108 |

| | Comp. Ex. IV-1 | Comp. Ex. IV-2 | Comp. Ex. IV-3*[14] | Comp. Ex. IV-4 | Comp. Ex. IV-5 | Comp. Ex. IV-6 | Comp. Ex. IV-7 | Comp. Ex. IV-8 | Comp. Ex. IV-9 |
|---|---|---|---|---|---|---|---|---|---|
| Natural rubber*[1] | 100 | 75 | 50 | 25 | — | 46.5 | 42.5 | 42.5 | 42.5 |
| High cis-BR*[2] | — | 25 | 50 | 75 | 100 | 46.5 | 42.5 | 42.5 | 42.5 |
| Block copolymer 1*[3] | — | — | — | — | — | — | — | — | — |
| Block copolymer 2*[4] | — | — | — | — | — | — | — | — | — |
| Block copolymer 3*[5] | — | — | — | — | — | — | — | — | — |
| Block copolymer 4*[6] | — | — | — | — | — | — | — | — | — |
| Block copolymer 5*[7] | — | — | — | — | — | 7 | 15 | — | — |
| Block copolymer 6*[8] | — | — | — | — | — | — | — | 15 | — |
| Block copolymer 7*[9] | — | — | — | — | — | — | — | — | 15 |
| Block copolymer 8*[10] | — | — | — | — | — | — | — | — | — |
| Carbon black*[11] | 50 | 50 | 50 | 50 | 50 | 50 | 50 | 50 | 50 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Antioxidant*[12] | 1 | 1 | 1 | 1 | 1 | 1 | 1 | 1 | 1 |

TABLE IV-1-continued

| Sulfur | 2 | 2 | 2 | 2 | 2 | 2 | 2 | 2 | 2 |
|---|---|---|---|---|---|---|---|---|---|
| Vulcanization accelerator*[13] | 1 | 1 | 1 | 1 | 1 | 1 | 1 | 1 | 1 |
| Total (PHR) | 158 | 158 | 158 | 158 | 158 | 158 | 158 | 158 | 158 |
| viscoelastic properties | | | | | | | | | |
| tan δ | | | | | | | | | |
| −20° C. | 0.508 | 0.356 | 0.273 | 0.210 | 0.175 | 0.273 | 0.276 | 0.272 | 0.273 |
| 0° C. | 0.262 | 0.211 | 0.183 | 0.165 | 0.162 | 0.185 | 0.182 | 0.181 | 0.182 |
| 60° C. | 0.141 | 0.134 | 0.125 | 0.118 | 0.127 | 0.126 | 0.127 | 0.123 | 0.126 |
| E' (MPa) | | | | | | | | | |
| −20° C. | 12.19 | 11.12 | 10.05 | 8.64 | 9.01 | 10.03 | 10.01 | 10.20 | 10.02 |
| 0° C. | 7.96 | 8.62 | 8.00 | 7.31 | 7.60 | 8.00 | 8.04 | 8.04 | 8.02 |
| 60° C. | 6.55 | 6.99 | 7.07 | 6.40 | 7.28 | 7.07 | 7.03 | 7.08 | 7.10 |
| Abrasion resistance index | 73 | 83 | 100 | 143 | 185 | 101 | 99 | 97 | 98 |

*[1]TTR-20
*[2]Nipol BR1220 (made by Nihon Zeon)
*[3]–*[10]Block copolymers (see Table IV-2)
*[11]Sheast 6 (made by Tokai Carbon Co.)
*[12]Santoflex 13 (made by Monsanto Corporation)
*[13]Santocure NS (made by Monsanto Corporation)
*[14]Standard example

TABLE IV-2

| Block copolymer | Ex. | Block A St content (wt %) | Block A Vn content (mol %) | Block B cis- content (wt %) | A/B weight ratio | Weight average molecular weight (10,000) | Coupling |
|---|---|---|---|---|---|---|---|
| *[3]Block copolymer 1 | Ex. | 23 | 35 | 82 | 50/50 | 35 | None |
| *[4]Block copolymer 2 | Ex. | 23 | 35 | 82 | 50/50 | 81 | Sn |
| *[5]Block copolymer 3 | Ex. | 28 | 57 | 85 | 50/50 | 43 | None |
| *[6]Block copolymer 4 | Ex. | 18 | 40 | 86 | 50/50 | 42 | None |
| *[7]Block copolymer 5 | Comp. Ex. | 23 | 35 | 52 | 50/50 | 40 | None |
| *[8]Block copolymer 6 | Comp. Ex. | 12 | 64 | 84 | 50/50 | 44 | None |
| *[9]Block copolymer 7 | Comp. Ex. | 0 | 55 | 86 | 50/50 | 40 | None |
| *[10]Block copolymer 8 | Ex. | 0 | 18 | 84 | 50/50 | 41 | None |

As explained above, according to the present invention, it is possible to obtain a rubber composition superior in the abrasion resistance (the larger the abrasion resistance index in Table IV-1 the better) (in Table IV-1, the higher the index, the better) without causing a reduction in the grip (the higher the tan δ at 0° C. the better the wet grip) and the fuel economy (the lower the tan δ at 60° C. the better) and the flexibility at low temperatures (the smaller the E' at −20° C. the better).

Examples V-1 to V-3 and Comparative Examples V-1 to V-3

1) Wet Skid Resistance

This was measured at room temperature (23° C.) using a British portable skid tester. As the road surface, a Sumitomo 3M safety walk was used. The measurement was performed after sprinkling water of room temperature (23° C.) on the road surface.

tan δ

This was measured using a viscoelastic spectrometer made by Toyo Seiki Seisakusho at a static strain of 10%, a dynamic strain of ±2%, and a frequency of 20 Hz (test sample width of 5 mm, 60° C.)

Embitterment Temperature

This was measured by the Low Temperature Shock Embrittlement Test Method defined in JIS K 6301.

Abrasion Resistance Test

This was measured using a Lambourn abrasion tester under conditions of a slip rate of 25% and a weight of 5 kg. The results were expressed by an index based on the rubber of the standard example of Comparative Example V-1 as 100 (abrasion resistance index). The larger the value, the better the abrasion resistance.

The components of each of the formulations (parts by weight) shown in Table V-1 were compounded. The starting rubber, except for a vulcanization accelerator and sulfur, and a compounding agent were mixed by a 1.7 liter Bambury mixer for 5 minutes, then the mixture was mixed together with the vulcanization accelerator and sulfur by an 8-inch test roll machine for 4 minutes to obtain the rubber composition. Each rubber composition was press vulcanized at 160° C. for 20 minutes to prepare the desired test pieces which were then subjected to various tests to determine their physical properties. The physical properties of the resultant vulcanates were as shown in Table V-1.

TABLE V-1

|  | Ex. V-1 | Ex. V-2 | Ex. V-3 | Comp. Ex. V-1 | Comp. Ex. V-2 | Comp. Ex. V-3 |
|---|---|---|---|---|---|---|
| SBR1*[1] | 38 | 36 | 34 | 40 | — | — |
| SBR2*[2] | 57 | 54 | 51 | 60 | — | — |
| SBR3*[3] | — | — | — | — | 150 | — |
| SBR4*[4] | — | — | — | — | — | 137.5 |
| Block copolymer*[5] | 5 | 10 | 15 | — | — | — |
| Carbon black*[6] | 95 | 95 | 95 | 95 | 95 | 95 |
| Aromatic oil | 50 | 50 | 50 | 50 | — | 12.5 |
| Zinc oxide | 3 | 3 | 3 | 3 | 3 | 3 |
| Stgaric acid | 2 | 2 | 2 | 2 | 2 | 2 |
| Antioxidant*[7] | 1 | 1 | 1 | 1 | 1 | 1 |
| Sulfur | 2 | 2 | 2 | 2 | 2 | 2 |
| Vulcanization accelerator*[8] | 1.5 | 1.5 | 1.5 | 1.5 | 1.5 | 1.5 |
| Total (parts by weight) | 254.5 | 254.5 | 254.5 | 254.5 | 254.5 | 254.5 |
| Wet skid resistance*[9] | 100 | 100 | 100 | 100 | 86 | 102 |
| tanδ (60° C.) | 0.393 | 0.396 | 0.395 | 0.394 | 0.436 | 0.424 |
| Embrittlement temperature (°C.) | −39 | −39 | −38 | −39 | −27 | −19 |
| Abrasion resistance index*[9] | 105 | 107 | 108 | 100 | 81 | 77 |

*[1]St = 47 wt %, Vn = 75 mol %, Tg = 3° C., Mw = 867,000, Si coupling (coupling rate: 68%)
*[2]St = 23 wt %, Vn = 10 mol %, Tg = −85° C., Mw = 1010,000, Si coupling (coupling rate: 62%)
*[3]Nipol 9526 (made by Nihon Zeon), St = 35 wt %, Vn = 14 mol %, Tg = −36° C., Mw = 718,000, containing 50 parts aromatic oil.
*[4]Tufdene 3335 (made by Asahi Chemical Industries), St = 40 wt %, Vn = 34 mol %, Tg = −26° C., Mw = 904,000, containing 37.5 parts aromatic oil.
*[5]Block copolymer 1 (see Table V-4)
*[6]Sheast 6 (made by Tokai Carbon Co.)
*[7]Santoflex 13 (made by Monsanto Corporation)
*[8]Nocceler CZ (made by Ouchi Shinkyo Kagaku)
*[9]Expressed as index using value of Comparative Example V-1 as 100.
(Note) St: styrene, Vn: vinyl

Examples V-4 to V-6 and Comparative Example V-4

The components of each of the formulations (parts by weight) shown in Table V-2 were compounded. The starting rubber, except for a vulcanization accelerator and sulfur, and compounding agents were mixed by a 1.7 liter Bambury mixer for 5 minutes, then the mixture was mixed together with the vulcanization accelerator and sulfur by an 8-inch test roll machine for 4 minutes to obtain the rubber composition. Each rubber composition was press vulcanized at 160° C. for 20 minutes to prepare the desired test pieces which were then subjected to various tests to evaluate their physical properties. The physical properties of the resultant vulcanates were as shown in Table V-2.

TABLE V-2

|  | Ex. V-4 | Ex. V-5 | Ex. V-6 | Comp. Ex. V-4 |
|---|---|---|---|---|
| SBR5*[1] | 66.5 | 63 | 59.5 | 70 |
| BR1*[2] | 28.5 | 27 | 25.5 | 30 |
| Block copolymer*[3] | 5 | 10 | 15 | — |
| Carbon black*[4] | 95 | 95 | 95 | 95 |
| Aromatic oil | 50 | 50 | 50 | 50 |
| Zinc oxide | 3 | 3 | 3 | 3 |
| Stearic acid | 2 | 2 | 2 | 2 |
| Antioxidant*[5] | 1 | 1 | 1 | 1 |
| Sulfur | 2 | 2 | 2 | 2 |
| Vulcanization accelerator*[6] | 1.5 | 1.5 | 1.5 | 1.5 |
| Total (parts by weight) | 254.5 | 254.5 | 254.5 | 254.5 |
| Wet skid resistance*[7] | 101 | 101 | 101 | 100 |
| tanδ (60° C.) | 0.415 | 0.416 | 0.416 | 0.415 |
| Embrittlement temperature (°C.) | −39 | −39 | −38 | −39 |
| Abrasion resistance index*[7] | 107 | 110 | 109 | 100 |

*[1]St = 41 wt %, Vn = 37 mol %, Tg = 20° C., Mw = 320,000
*[2]St = 0 wt %, Vn = 14 mol %, Tg = −92° C., Mw = 920,000, Si coupling (coupling rate: 63%)
*[3]Block copolymer 2 (see Table V-4).
*[4]Sheast 6 (made by Tokai Carbon Co.)
*[5]Santoflex 13 (made by Monsanto Corporation)
*[6]Nocceler CZ (made by Ouchi Shinkyo Kagaku)
*[7]Expressed as index using value of Comparative Example V-4 as 100.
(Note) St: styrene, Vn: vinyl

Examples V-7 to V-9 and Comparative Example V-5

The components of each of the formulations (parts by weight) shown in Table V-3 were compounded. The starting rubber, except for a vulcanization accelerator and sulfur, and compounding agents were mixed by a 1.7 liter Bambury mixer for 5 minutes, then the mixture was mixed together with the vulcanization accelerator and sulfur by an 8-inch test roll machine for 4 minutes to obtain the rubber composition. Each rubber composition was press vulcanized at 160° C. for 20 minutes to prepare the desired test pieces which were then subjected to various tests to determine their physical properties. The physical properties of the resultant vulcanates were as shown in Table V-3.

TABLE V-3

|  | Ex. V-7 | Ex. V-8 | Ex. V-9 | Comp. Ex. V-5 |
|---|---|---|---|---|
| SBR6*[1] | 57 | 54 | 51 | 60 |
| BR2*[2] | 38 | 36 | 34 | 40 |
| Block copolymer*[3] | 5 | 10 | 15 | — |

TABLE V-3-continued

|  | Ex. V-7 | Ex. V-8 | Ex. V-9 | Comp. Ex. V-5 |
|---|---|---|---|---|
| Carbon black*[4] | 95 | 95 | 95 | 95 |
| Aromatic oil | 50 | 50 | 50 | 50 |
| Zinc oxide | 3 | 3 | 3 | 3 |
| Stearic acid | 2 | 2 | 2 | 2 |
| Antioxidant*[5] | 1 | 1 | 1 | 1 |
| Sulfur | 2 | 2 | 2 | 2 |
| Vulcanization accelerator*[6] | 1.5 | 1.5 | 1.5 | 1.5 |
| Total (parts by weight) | 254.5 | 254.5 | 254.5 | 254.5 |
| Wet skid resistance*[7] | 991 | 100 | 101 | 100 |
| tanδ (60° C.) | 0.404 | 0.400 | 0.403 | 0.402 |
| Embrittlement temperature (°C.) | −39 | −39 | −38 | −39 |
| Abrasion resistance index*[7] | 106 | 107 | 108 | 100 |

*[1]St = 47 wt %, Vn = 75 mol %, Tg = 3° C., Mw = 867,000, Si coupling (coupling rate: 68%)
*[2]Cis = 99%
*[3]Block copolymer 3 (see Table V-4).
*[4]Sheast 6 (made by Tokai Carbon Co.)
*[5]Santoflex 13 (made by Monsanto Corporation)
*[6]Nocceler CZ (made by Ouchi Shinkyo Kagaku)
*[7]Expressed as index using value of Comparative Example 5 as 100.
(Note) St: styrene, Vn: vinyl

TABLE V-4

|  | Block A | | Block B | | | Weight average | |
|---|---|---|---|---|---|---|---|
|  | St content (wt %) | Vn content (mol %) | St content (wt %) | Vn content (mol %) | A/B weight ratio | molecular weight (10,000) | Coupling |
| Block copolymer 1 | 45 | 72 | 22 | 14 | 50/50 | 50 | None |
| Block copolymer 2 | 40 | 15 | 12 | 14 | 50/50 | 50 | None |
| Block copolymer 3 | Polyisoprene (cis content at least 89 wt %) |  | 20 | 40 | 50/50 | 50 | None |

(Note) St: styrene, Vn: vinyl

As explained above, according to the present invention, it is possible to obtain a rubber composition superior in the abrasion resistance (the larger the abrasion resistance index in Tables IV-1 to V-3, the better) without causing a reduction in the wet skid resistance, fuel economy (the lower the tanδ (60° C.), the better), and the low temperature embrittlement resistance.

Examples VI-1 to VI-3 and comparative Examples VI-1 to VI-8

Viscoelastic Property (tanδ)

This was measured using a viscoelastic spectrometer made by Toyo Seiki Seisakusho at a static strain of 10%, a dynamic strain of ±2%, and a frequency of 20 Hz (test sample width of 5 mm, 60° C.)

Abrasion Resistance Test

This was measured using a Lambourn abrasion tester under conditions of a slip rate of 25% and a weight of 5 kg. The results were expressed by an index based on the rubber of the standard example of Comparative Example VI-3 or VI-9 as 100 (abrasion resistance index). The larger the value, the better the abrasion resistance.

Wet Skid Resistance

This was measured using a British portable skid tester under conditions of a wet road surface and a temperature of 20° C. The values were expressed as indexes using Comparative Example VI-3 or VI-9 as 100. The larger the values, the better the wet skid resistance.

Embrittlement Temperature

This was measured by the Low Temperature Shock Embrittlement Test Method defined in JIS K 6301. The lower the value, the better the winter performance.

The components of each of the formulations (parts by weight) shown in Table IV-1 were compounded. The components were mixed by a 1.7 liter Bambury mixer for 5 minutes by the method of mixing shown in Table VI-1 (see below), then the mixture was mixed together with the vulcanization accelerator and sulfur by an 8-inch test roll machine for 4 minutes to obtain the rubber composition. Each rubber composition was press vulcanized at 160° C. for 20 minutes to prepare the desired test pieces which were then subjected to various tests to determine their physical properties. The physical properties of the resultant vulcanates were as shown in Table VI-1.

The methods A to D of mixing used in the Examples and Comparative Examples were as follows:

Method of Mixing A (Method of Mixing of Present Invention)

When mixing into a matrix of at least two types of incompatible diene rubber components A and B a block copolymer having a block A' compatible with A and incompatible with B and a block B' compatible with both B and A, (1) first the matrix B, the block copolymer, and 15 parts by weight of carbon black are mixed, (2) then the matrix A is added. It is possible to discharge the mixture once from the mixer between the mixing of (1) and (2) or do this in the middle of a series of mixing steps. However, at the stage of (1), it is necessary to check the BIT (Blank Incorporation Time) on the mixing torque chart so that surricient carbon gel can be formed and then proceed to the step of (2).

Method of Mixing B (Ordinary Mixing)

The matrix components A and B and the block copolymer are mixed simultaneously. The carbon black is added at the same time as the polymer. (Note that the carbon black may also be added after the kneading of the polymer alone.)

Method of Mixing C (Reverse Procedure of Present Invention)

(1) First the matrix A, the block copolymer, and 15 parts by weight of carbon black are mixed, (2) then the matrix B is added. It is possible to discharge the mixture once from the mixer between the mixing of (1) and (2) or do this in the middle of a series of mixing steps. However, at the stage of (1), it is necessary to check the BIT on the mixing torque chart so that surricient carbon gel can be formed and then proceed to the step of (2).

Method of Mixing D (Mixing in of Carbon Black at Next Step in Method of Mixing of Present Invention)

(1) First, the matrix B and the block copolymer are mixed (carbon black is not added), (2) then the matrix A and the carbon black are added and mixed.

The mixture is discharged once from the mixer between the mixing of (1) and (2) (or this is done in the middle of a series of mixing steps). However, at the stage of (2), it is necessary to check the BIT on the mixing torque chart so that surricient carbon gel can be formed and then discharge the mixture.

Common Matters for All Methods of Mixing

Other compounding agents normally used in addition to the above vulcanization system are mixed in at the step (2) in A, C, and D (however, the invention is not limited to this).

The vulcanization compounding agenets are added in accordance with ordinary methods after the above methods of mixing are performed.

VI-3.

TABLE VI-1

|  | Ex. VI-1 | Ex. VI-2 | Ex. VI-3 | Comp. Ex. VI-1 | Comp. Ex. VI-2 | Comp. Ex. VI-3 | Comp. Ex. VI-4 | Comp. Ex. VI-5 | Comp. Ex. VI-6 | Comp. Ex. VI-7 | Comp. Ex. VI-8 |
|---|---|---|---|---|---|---|---|---|---|---|---|
| Method of mixing | A | A | A | B | B | B | B | B | B | C | D |
| Natural rubber*[1] | 46.5 | 45 | 42.5 | 100 | 70 | 50 | 30 | — | 45 | 45 | 45 |
| SBR*[2] | 46.5 | 45 | 42.5 | — | 30 | 50 | 70 | 100 | 45 | 45 | 45 |
| Block copolymer 1*[3] | 7 | 10 | 15 | — | — | — | — | — | 10 | 10 | 10 |
| Carbon black*[4] | 50 | 50 | 50 | 50 | 50 | 50 | 50 | 50 | 50 | 50 | 50 |
| Zinc oxide | 3 | 3 | 3 | 3 | 3 | 3 | 3 | 3 | 3 | 3 | 3 |
| Stearic acid | 1 | 1 | 1 | 1 | 1 | 1 | 1 | 1 | 1 | 1 | 1 |
| Antioxidant*[5] | 1 | 1 | 1 | 1 | 1 | 1 | 1 | 1 | 1 | 1 | 1 |
| Sulfur | 2 | 2 | 2 | 2 | 2 | 2 | 2 | 2 | 2 | 2 | 2 |
| Vulcanization accelerator*[6] | 1 | 1 | 1 | 1 | 1 | 1 | 1 | 1 | 1 | 1 | 1 |
| Total (PHR) | 158 | 158 | 158 | 158 | 158 | 158 | 158 | 158 | 158 | 158 | 158 |
| Wet skid resistance | 100 | 100 | 100 | 60 | 77 | 100 | 134 | 199 | 100 | 100 | 100 |
| tanδ (60° C.) | 0.157 | 0.155 | 0.152 | 0.161 | 0.163 | 0.153 | 0.16 | 0.16 | 0.157 | 0.154 | 0.155 |
| Abrasion resistance index | 107 | 109 | 112 | 118 | 102 | 100 | 95 | 92 | 105 | 92 | 104 |

*[1]TTR-20
*[2]NS116: st = 20% by weight, Vn = 65 molar % (made by Nihon Zeon)
*[3]Block copolymer 1 (see Table VI-2)
*[4]Sheast KH (made by Tokai Carbon Co.)
*[5]Santoflex 13 (made by Monsanto Corporation)
*[6]Santocure NS (made by Monsanto Corporation)

TABLE VI-2

|  | Block A' | | Block B' | | A'/B' weight ratio | Weight average molecular weight (10,000) | Coupling |
|---|---|---|---|---|---|---|---|
|  | St content (wt %) | Vn content (mol %) | St content (wt %) | Vn content (mol %) | | | |
| Block copolymer 1 | 21 | 13 | 15 | 70 | 50/50 | 61 | None |
| Block copolymer 2 | 25 | 40 | 12 | 72 | 50/50 | 57 | Sn |

(Note): Both block copolymers 1 and 2 are examples of present invention.

Examples VI-4 to VI-6 and Comparative Examples VI-9 to VI-12

The same procedures were followed as in Example VI-1 to VI-3 and Comparative Examples VI-1 to VI-8 to compound the components of the formulations shown in Table IV-2 and evaluate the results. The results are shown in Table

TABLE VI-2

|  | Ex. VI-4 | Ex. VI-5 | Ex. VI-6 | Comp. Ex. VI-9 | Comp. Ex. VI-10 | Comp. Ex. VI-11 | Comp. Ex. VI-12 |
|---|---|---|---|---|---|---|---|
| Method of mixing | A | A | A | B | B | C | D |
| SBR*[1] | 37.2 | 36 | 34 | 40 | 36 | 36 | 36 |
| SBR*[2] | 55.8 | 54 | 51 | 60 | 54 | 54 | 54 |
| Block copolymer 2*[3] | 7 | 10 | 15 | — | 10 | 10 | 10 |
| Carbon black*[4] | 95 | 95 | 95 | 95 | 95 | 95 | 95 |
| Aromatic oil | 50 | 50 | 50 | 50 | 50 | 50 | 50 |
| Zinc oxide | 3 | 3 | 3 | 3 | 3 | 3 | 3 |
| Stearic acid | 2 | 2 | 2 | 2 | 2 | 2 | 2 |
| Antioxidant*[5] | 1 | 1 | 1 | 1 | 1 | 1 | 1 |
| Sulfur | 2 | 2 | 2 | 2 | 2 | 2 | 2 |
| Vulcanization accelerator*[6] | 1.5 | 1.5 | 1.5 | 1.5 | 1.5 | 1.5 | 1.5 |
| Total (PHR) | 254.5 | 254.5 | 254.5 | 254.5 | 254.5 | 254.5 | 254.5 |
| Wet skid resistance | 100 | 99 | 101 | 100 | 101 | 99 | 100 |
| Embrittlement temperature (°C.) | −39 | −39 | −40 | −40 | −40 | −39 | −40 |
| Abrasion resistance index | 108 | 108 | 109 | 100 | 104 | 97 | 103 |

*[1]St = 45 wt %, Vn = 60 mol %
*[2]Nipol BR 1220 (made by Nihon Zeon)
*[3]Block copolymer 2 (see Table VI-2)
*[4]Sheast 6 (made by Tokai Carbon Co.)
*[5]Santoflex 13 (made by Monsanto Corporation)
*[6]Nocceler CZ (made by Ouchi Shinkyo Kagaku)

As explained above, according to the present invention, it is possible to obtain a rubber composition for a tire tread superior in the abrasion resistance (the larger the abrasion resistance index in Tables VI-1 and VI-3, the better) without causing a reduction in the viscoelastic properties, wet skid resistance, and winter performance.

Examples VII-1 to VII-10 and Comparative Examples VII-1 to VII-9

1) Viscoelastic Properties

These were measured using a viscoelastic spectrometer made by Toyo Seiki Seisakusho at a static strain of 10%, a dynamic strain of ±2%, and a frequency of 20 Hz (test sample width of 5 mm, 0° C., 60° C.)

Abrasion Resistance Test

This was measured using a Lambourn abrasion tester under conditions of a slip rate of 25% and a weight of 5 kg. The results were expressed by an index based on the rubber of the Standard Example of Comparative Example VII-3 (Table I) or VII-12 (Table II) as 100 (abrasion resistance index). The larger the value, the better the abrasion resistance.

The components of each of the formulations (parts by weight) shown in Table VII-1 were compounded. The starting rubber, except for a vulcanization accelerator and sulfur, and compounding agents were mixed by a 1.7 liter Bambury mixer for 5 minutes, then the mixture was mixed together with the vulcanization accelerator and sulfur by an 8-inch test roll machine for 4 minutes to obtain the rubber composition. Each rubber composition was press vulcanized at 160° C. for 20 minutes to prepare the desired test pieces which were then subjected to various tests to determine their physical properties. The physical properties of the resultant vulcanates were as shown in Table VII-1.

TABLE VII-1

|  | Ex. VII-1 | Ex. VII-2 | Ex. VII-3 | Ex. VII-4 | Ex. VII-5 | Ex. VII-6 | Ex. VII-7 | Ex. VII-8 | Ex. VII-9 | Ex. VII-10 |
|---|---|---|---|---|---|---|---|---|---|---|
| Natural Rubber*[1] | 46.5 | 42.5 | 46.5 | 42.5 | 46.5 | 42.5 | 46.5 | 42.5 | 46.5 | 42.5 |
| SBR*[2] | 46.5 | 42.5 | 46.5 | 42.5 | 46.5 | 42.5 | 46.5 | 42.5 | 46.5 | 42.5 |
| Block copolymer 1*[3] | 7 | 15 | — | — | — | — | — | — | — | — |
| " 2*[4] | — | — | 7 | 15 | — | — | — | — | — | — |
| " 3*[5] | — | — | — | — | 7 | 15 | — | — | — | — |
| " 4*[6] | — | — | — | — | — | — | 7 | 15 | — | — |
| " 5*[7] | — | — | — | — | — | — | — | — | — | — |
| " 6*[8] | — | — | — | — | — | — | — | — | — | — |
| " 7*[9] | — | — | — | — | — | — | — | — | — | — |
| " 8*[10] | — | — | — | — | — | — | — | — | 7 | 15 |
| Carbon black*[11] | 50 | 50 | 50 | 50 | 50 | 50 | 50 | 50 | 50 | 50 |
| Zinc oxide | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Antioxidant*[12] | 1 | 1 | 1 | 1 | 1 | 1 | 1 | 1 | 1 | 1 |
| Sulfur | 2 | 2 | 2 | 2 | 2 | 2 | 2 | 2 | 2 | 2 |
| Vulcanization acceleration*[13] | 1 | 1 | 1 | 1 | 1 | 1 | 1 | 1 | 1 | 1 |
| Total (PHR) | 158 | 158 | 158 | 158 | 158 | 158 | 158 | 158 | 158 | 158 |
| viscoelasticity tan δ |  |  |  |  |  |  |  |  |  |  |
| 0° C. | 0.318 | 0.320 | 0.324 | 0.322 | 0.323 | 0.322 | 0.324 | 0.323 | 0.318 | 0.317 |
| 60° C. | 0.165 | 0.166 | 0.164 | 0.165 | 0.163 | 0.166 | 0.165 | 0.165 | 0.162 | 0.162 |
| Abrasion resistance index | 107 | 109 | 109 | 112 | 107 | 108 | 106 | 107 | 106 | 107 |

|  | Comp. Ex. VII-1 | Comp. Ex. VII-2 | Comp. Ex. VII-3*[14] | Comp. Ex. VII-4 | Comp. Ex. VII-5 | Comp. Ex. VII-6 | Comp. Ex. VII-7 | Comp. Ex. VII-8 | Comp. Ex. VII-9 |
|---|---|---|---|---|---|---|---|---|---|
| Natural Rubber*[1] | 100 | 70 | 50 | 30 | — | 46.5 | 42.5 | 42.5 | 42.5 |
| SBR*[2] | — | 30 | 50 | 70 | 100 | 46.5 | 42.5 | 42.5 | 42.5 |
| Block copolymer 1*[3] | — | — | — | — | — | — | — | — | — |
| " 2*[4] | — | — | — | — | — | — | — | — | — |
| " 3*[5] | — | — | — | — | — | — | — | — | — |
| " 4*[6] | — | — | — | — | — | — | — | — | — |
| " 5*[7] | — | — | — | — | — | 7 | 15 | — | — |
| " 6*[8] | — | — | — | — | — | — | — | 15 | — |
| " 7*[9] | — | — | — | — | — | — | — | — | 15 |
| " 8*[10] | — | — | — | — | — | — | — | — | — |
| Carbon black*[11] | 50 | 50 | 50 | 50 | 50 | 50 | 50 | 50 | 50 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Antioxidant*[12] | 1 | 1 | 1 | 1 | 1 | 1 | 1 | 1 | 1 |
| Sulfur | 2 | 2 | 2 | 2 | 2 | 2 | 2 | 2 | 2 |
| Vulcanization acceleration*[13] | 1 | 1 | 1 | 1 | 1 | 1 | 1 | 1 | 1 |
| Total (PHR) | 158 | 158 | 158 | 158 | 158 | 158 | 158 | 158 | 158 |
| viscoelasticity tan δ |  |  |  |  |  |  |  |  |  |
| 0° C. | 0.279 | 0.306 | 0.322 | 0.331 | 0.337 | 0.324 | 0.323 | 0.322 | 0.320 |
| 60° C. | 0.171 | 0.169 | 0.165 | 0.161 | 0.143 | 0.166 | 0.166 | 0.167 | 0.166 |
| Abrasion resistance index | 110 | 103 | 100 | 98 | 97 | 98 | 97 | 100 | 101 |

*[1]TTR-20
*[2]NS114: St = 25 wt %, Vn = 35 mol % (made by Nihon Zeon)
*[3]–*[10]Block copolymers (see Table VII-3)
*[11]Seast KH (made by Tokai Carbon Co.)
*[12]Santoflex 13 (made by Monsanto Co.)
*[13]Santocure NS (made by Monsanto Co.)
*[14]Standard Example Example VII-11 to VII-18 and Comparative Example VII-10 to VII-18

Examples VII-1 to VII-10 and Comparative Example VII-10 to Comparative Example VII-18 were repeated in the same manner except that the types of SBR were changed. The compositions and the results obtained are shown in Table VII-2.

TABLE VII-2

|  | Ex. VII-11 | Ex. VII-12 | Ex. VII-13 | Ex. VII-14 | Ex. VII-15 | Ex. VII-16 | Ex. VII-17 | Ex. VII-18 |
|---|---|---|---|---|---|---|---|---|
| Natural Rubber*[1] | 46.5 | 42.5 | 46.5 | 42.5 | 46.5 | 42.5 | 46.5 | 42.5 |
| SBR*[2] | 46.5 | 42.5 | 46.5 | 42.5 | 46.5 | 42.5 | 46.5 | 42.5 |

TABLE VII-2-continued

|  |  |  |  |  |  |  |  |  |
|---|---|---|---|---|---|---|---|---|
| Block copolymer 1*³ | 7 | 15 | — | — | — | — | — | — |
| " 2*⁴ | — | — | 7 | 15 | — | — | — | — |
| " 3*⁵ | — | — | — | — | 7 | 15 | — | — |
| " 4*⁶ | — | — | — | — | — | — | 7 | 15 |
| " 5*⁷ | — | — | — | — | — | — | — | — |
| " 6*⁸ | — | — | — | — | — | — | — | — |
| " 7*⁹ | — | — | — | — | — | — | — | — |
| " 8*¹⁰ | — | — | — | — | — | — | — | — |
| Carbon black*¹¹ | 50 | 50 | 50 | 50 | 50 | 50 | 50 | 50 |
| Zinc oxide | 3 | 3 | 3 | 3 | 3 | 3 | 3 | 3 |
| Stearic acid | 1 | 1 | 1 | 1 | 1 | 1 | 1 | 1 |
| Antioxidant*¹² | 1 | 1 | 1 | 1 | 1 | 1 | 1 | 1 |
| Sulfur | 2 | 2 | 2 | 2 | 2 | 2 | 2 | 2 |
| Vulcanization acceleration*¹³ | 1 | 1 | 1 | 1 | 1 | 1 | 1 | 1 |
| Total (PHR) | 158 | 158 | 158 | 158 | 158 | 158 | 158 | 158 |
| viscoelasticity tan δ |  |  |  |  |  |  |  |  |
| 0° C. | 0.509 | 0.510 | 0.507 | 0.508 | 0.509 | 0.512 | 0.509 | 0.510 |
| 60° C. | 0.160 | 0.161 | 0.158 | 0.158 | 0.156 | 0.158 | 0.158 | 0.159 |
| Abrasion resistance index | 107 | 108 | 107 | 110 | 109 | 111 | 107 | 107 |

|  | Comp. Ex. VII-10 | Comp. Ex. VII-11 | Comp. Ex. VII-12*¹⁴ | Comp. Ex. VII-13 | Comp. Ex. VII-14 | Comp. Ex. VII-15 | Comp. Ex. VII-16 | Comp. Ex. VII-17 | Comp. Ex. VII-18 |
|---|---|---|---|---|---|---|---|---|---|
| Natural Rubber*¹ | 100 | 75 | 50 | 25 | — | 46.5 | 42.5 | 42.5 | 42.5 |
| SBR*² | — | 25 | 50 | 75 | 100 | 46.5 | 42.5 | 42.5 | 42.5 |
| Block copolymer 1*³ | — | — | — | — | — | — | — | — | — |
| " 2*⁴ | — | — | — | — | — | — | — | — | — |
| " 3*⁵ | — | — | — | — | — | — | — | — | — |
| " 4*⁶ | — | — | — | — | — | — | — | — | — |
| " 5*⁷ | — | — | — | — | — | 7 | 15 | — | — |
| " 6*⁸ | — | — | — | — | — | — | — | 15 | — |
| " 7*⁹ | — | — | — | — | — | — | — | — | 15 |
| " 8*¹⁰ | — | — | — | — | — | — | — | — | — |
| Carbon black*¹¹ | 50 | 50 | 50 | 50 | 50 | 50 | 50 | 50 | 50 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Antioxidant*¹² | 1 | 1 | 1 | 1 | 1 | 1 | 1 | 1 | 1 |
| Sulfur | 2 | 2 | 2 | 2 | 2 | 2 | 2 | 2 | 2 |
| Vulcanization acceleration*¹³ | 1 | 1 | 1 | 1 | 1 | 1 | 1 | 1 | 1 |
| Total (PHR) | 158 | 158 | 158 | 158 | 158 | 158 | 158 | 158 | 158 |
| viscoelasticity tan δ |  |  |  |  |  |  |  |  |  |
| 0° C. | 0.271 | 0.384 | 0.507 | 0.661 | 0.989 | 0.508 | 0.510 | 0.502 | 0.506 |
| 60° C. | 0.156 | 0.161 | 0.158 | 0.158 | 0.158 | 0.160 | 0.160 | 0.157 | 0.158 |
| Abrasion resistance index | 118 | 102 | 100 | 96 | 94 | 97 | 98 | 101 | 100 |

*¹TTR-20
*²NS114: St = 20 wt %, Vn = 65 mol % (made by Nihon Zeon)
*³–*¹⁰Block copolymers (see Table VII-3)
*¹¹Seast KH (made by Tokai Carbon Co.)
*¹²Santoflex 13 (made by Monsanto Co.)
*¹³Santocure NS (made by Monsanto Co.)
*¹⁴Standard Example

TABLE VII-3

| Block copolymer |  | Block A St (wt %) | Block A Vn (mol %) | Block B cis (wt %) | A/B weight ratio | Weight average molecular weight (× 10,000) | Coupling |
|---|---|---|---|---|---|---|---|
| Block copolymer 1*³ | Ex. | 23 | 35 | 82 | 50/50 | 35 | None |
| Block copolymer 2*⁴ | " | 23 | 35 | 82 | 50/50 | 81 | Sn |
| Block copolymer 3*⁵ | " | 35 | 50 | 85 | 50/50 | 43 | None |
| Block copolymer 4*⁶ | " | 28 | 57 | 85 | 50/50 | 42 | " |
| Block copolymer 5*⁷ | Comp. Ex. | 23 | 35 | 52 | 50/50 | 40 | " |
| Block copolymer 6*⁸ | " | 12 | 62 | 84 | 50/50 | 44 | " |
| Block copolymer 7*⁹ | " | 0 | 55 | 86 | 50/50 | 40 | " |
| Block copolymer 8*¹⁰ | Ex. | 0 | 18 | 84 | 50/50 | 41 | " |

We claim:

1. A rubber composition comprising
   (i) at least one rubber selected from the group consisting of natural rubber and polyisoprene rubber;
   (ii) at least one rubber selected from the group consisting of styrene-butadiene copolymer rubber and polybutadiene rubber; and
   (iii) an A-B block copolymer composed of a block (A) having a styrene content (St) of 0 to 30% by weight and a butadiene content (Bd) of 100 to 70% by weight and having a 1,2-vinyl bond content (Vn) of 5 to 40% and a block (B) having a styrene content (St) of 0 to 30% by weight and a butadiene content (Bd) of 100 to 70% by weight and having a 1,2-vinyl bond content (Vn) of 70% or more, the weight ratio of (A)/(B) being 20 -80/80 -20 and the content of the A-B block copolymer being 0.5 to 20 parts by weight based on 100 parts by weight of total amount of the components (i), (ii) and (iii).

2. A rubber composition as claimed in claim 1, further comprising 20 to 100 parts by weight of at least one reinforcing filler selected from the group consisting of carbon black and silica, based upon 100 parts by weight of the components (i), (ii), and (iii).

3. A rubber composition for a tire tread comprising (i) at least one rubber selected from the group consisting of natural rubber and polyisoprene rubber, (ii) a polybutadiene rubber having a 1,2-vinyl bond content (Vn) of not more than 30%, (iii) an A-B block copolymer composed of a block (A) having a styrene content (St) of 0 to 30% by weight and a butadiene content (Bd) of 100 to 70% by weight, and having a 1,2-vinyl bond content of 5 to 40% and a block (B) having a styrene content (St) of 0 to 30% by weight and a butadiene content (Bd) of 100 to 70% by weight, and having a 1,2-vinyl bond content (Vn) of at least 70%, the weight ratio of (A)/(B), being 20 -80/80 -20, and (iv) at least one softening agent selected from the group consisting of an aromatic oil, paraffinic oil, and ester plasticizer, the weight ratio of the components (i) and (ii) being 70 to 30/30 to 70, the amount of compounding of the A-B block copolymer of the component (iii) being 2 to 20 parts by weight based upon 100 parts by weight of the total of the components (i), (ii), and (iii), and the content of the softening agent being 5 to 50 parts by weight based upon 100 parts by weight of the total of the components (i), (ii), and (iii).

4. A rubber composition as claimed in claim 3, wherein a foaming agent and a urea-based foaming assistant are further compounded to give an average cell area occupancy of the tread surface of 1 to 4%.

5. A rubber composition as claimed in claim 3, wherein staple fibers having an average length of 1 to 5000 μm and an average aspect ratio of 10 to 1000 are compounded in an amount of 0.5 to 15 parts by weight based upon 100 parts by weight of the total of the components (i), (ii), and (iii).

6. A rubber composition as claimed in claim 3, wherein a vulcanized rubber composition having an average particle size of not more than 2 mm is compounded in an amount of 1 to 20 parts by weight based upon 100 parts by weight of the total of the components (i), (ii), and (iii).

7. A rubber composition comprising (i) at least one rubber selected from the group consisting of natural rubber and polyisoprene rubber, (ii) a high cis-polybutadiene rubber, and (iii) an A-B block copolymer composed of a poly (styrene-butadiene) or polybutadiene block (A) having a styrene content (St) of 0 to 35% by weight and a butadiene content (Bd) of 65 to 100% by weight, and having a 1,2-vinyl bond content (Vn) of 5 to 80% and satisfying the relationship of Vn≦2St+30 and a poly(styrene-butadiene) or polybutadiene block (B) having a styrene content (St) of 0 to 30% by weight, a butadiene content (Bd) of 70 to 100% by weight, and having a 1,2-vinyl bond content (Vn) satisfying the relationship of Vn>2St+30, the weight ratio of (A)/(B), being 20 to 80/80 to 20, the content of the A-B block copolymer being 2 to 20 parts by weight based upon 100 parts by weight of the total of the components (i), (ii), and (iii).

8. A rubber composition as claimed in claim 7, wherein the weight average molecular weight of the A-B block copolymer is not less than 30,000.

9. A rubber composition comprising (i) at least one rubber selected from the group consisting of natural rubber and a polyisoprene rubber, (ii) a high cis-polybutadiene, and (iii) an A-B block copolymer composed of (a) a poly(styrene-butadiene) block (A) having a styrene content (St) of not more than 35% by weight and a butadiene content (Bd) of at least 65% by weight, and having a 1,2-vinyl bond content (Vn) of 5 to 80% and satisfying the relationship of Vn≦2St+30 or (b) a polybutadiene block (A) having a 1,2-vinyl bond content (Vn) of more than 10% and not more than 30% and a polyisoprene block (B) having a cis-content of not less than 70% by weight, the weight ratio (A)/(B), being 20 to 80/80 to 20, the content of the A-B block copolymer being 2 to 20 parts by weight based upon 100 parts by weight of the total of the components (i), (ii), and (iii).

10. A rubber composition as claimed in claim 9, wherein the weight average molecular weight of the A-B block copolymer is not less than 30,000.

11. A rubber composition comprising (i) a styrene-butadiene copolymer rubber (SBR) having a glass transition point (Tg) of not less than −40° C., (ii) a styrene-butadiene copolymer (SBR) and/or polybutadiene rubber (BR) which is incompatible with the SBR of the above component (i) and which has a Tg of at least 10° C. lower than the Tg of the SBR of the component (i) and (iii) an A-B block copolymer composed of a block A comprising a styrene-butadiene copolymer (SBR) or polyisoprene (IR) which is compatible with the SBR of the component (i) and incompatible with the SBR and/or BR of the component (ii) and a block B comprising a styrene-butadiene copolymer (SBR) or polybutadiene (BR) which is compatible with the SBR or BR of the component (ii) and incompatible with the SBR of the component (i), in an amount of 1 to 20 parts by weight based upon 100 parts by weight of the total of the components (i), (ii), and (iii).

12. A rubber composition as claimed in claim 11, wherein the weight average molecular weight of the block copolymer of the blocks A and B is not less than 30,000.

13. A rubber composition comprising (i) 80 to 99 parts by weight of at least two incompatible diene rubbers A and B wherein the weight ratio A/B of the diene rubbers A and B=10/90 to 90/10 and (ii) 1 to 20 parts by weight of an A'-B' block polymer composed of a block A' compatible with the diene rubber A and incompatible with B and a block B' compatible with both the diene rubbers A and B, wherein first the A'-B' block polymer, diene rubber B, and at least 10 parts by weight of a reinforcing filler based upon 100 parts by weight of the total of the rubber and polymer are mixed.

14. A rubber composition as claimed in claim 13, wherein the diene rubber A is a polybutadiene rubber (BR) or styrene-butadiene copolymer rubber (SBR) with a styrene content (St) of 0 to 50% by weight and a 1,2-vinyl bond content (Vn) of 5 to 8% and not more than (2St +30)%; the diene rubber B is at least one diene rubber selected from the group consisting of natural rubber (NR) and polyisoprene rubber (IR); the A' block of the A'-B' block polymer is a BR or SBR with a styrene content of 0 to 50% by weight and a 1,2-vinyl bond content of 5 to 85% and not more than (2St+30)%; the B' block is a BR or SBR with a styrene content (St) of 0 to 30% by weight and a 1,2-vinyl bond content (Vn) of larger than (2St+30)% or an IR having a cis content of not less than 70% by weight; and the weight ratio of A'/B' is 20/80 to 80/20.

15. A rubber composition as claimed in claim 13, wherein the diene rubber A is BR having a cis-1,4 bond content of not less than 80%; the diene rubber B is at least one rubber selected from the group of NR and IR; the A' block is BR or SBR having a styrene content (St) of 0 to 35% by weight and a 1,2-vinyl bond content of 35 to 70% and not more than (2St+30)%; the B' block is BR or SBR having a styrene content (St) of 0 to 30% by weight and a 1,2-vinyl bond content of larger than (2St+30)% or IR having a cis content of not less than 70% by weight; and the weight ratio of A'/B' is 20/80 to 80/20.

16. A rubber composition as claimed in claim 13, wherein the diene rubber A has a styrene content (St) of 0 to 55% by weight and a 1,2-vinyl bond content of less than 35%, an St of 30 to 55% by weight and a 1,2-vinyl bond content of 35 to 70%, or an St of 0 to 55% by weight and a 1,2-vinyl bond content of more than 70%; the diene rubber B is BR having a cis-1,4 bond content of at least 80%; the A' block has an St of 0 to 55% by weight and a 1,2-vinyl bond content of less than 35%, an St of 30 to 55% by weight and a 1,2-vinyl bond content of 35 to 70%, or an St of 0 to 55% by weight and a 1,2-vinyl bond content of more than 70%; the B' block is BR or SBR having a styrene content (St) of 0 to 30% by weight and a 1,2-vinyl bond content of 35 to 70%; and the weight ratio of A'/B' of the block polymer is 20/80 to 80/20.

17. A rubber composition comprising (i) at least one rubber selected from the group consisting of natural rubber and a polyisoprene rubber, (ii) a styrene-butadiene copolymer rubber (SBR) having a styrene content (St) of not more than 50% by weight and a 1,2-vinyl bond content (Vn) of the butadiene moiety of not more than 80 mol % and satisfying the relationship of $Vn \leq 2St+30$ and (iii) an A-B block copolymer composed of (a) a poly(styrene-butadiene) block (A) having a styrene content (St) of 0 to 50% by weight and a butadiene content (Bd) of 50 to 100% by weight, and having a 1,2-vinyl bond content (Vn) of 5 to 70% and satisfying the relationship of $Vn \leq 2St+30$ or (b) a polybutadiene block (A) having a 1,2-vinyl bond content (Vn) of 5 to 30% and a polyisoprene block (B) having a cis-content of not less than 70% by weight, the weight ratio (A)/(B), being 20 to 80/80 to 20, the content of the A-B block copolymer being 2 to 20 parts by weight based upon 10 parts by weight of the total of the components (i), (ii), and (iii).

18. A rubber composition as claimed in claim 17, wherein the weight average molecular weight of the A-B block copolymer is not less than 30,000.

* * * * *

UNITED STATES PATENT AND TRADEMARK OFFICE
CERTIFICATE OF CORRECTION

PATENT NO. : 5,679,744
DATED : October 21, 1997
INVENTOR(S) : Tetsuji Kawazura et al.

It is certified that error appears in the above-indentified patent and that said Letters Patent is hereby corrected as shown below:

On Title page, under item [19] and item [75], "Kawauzra" should read --Kawazura--.

Claim 17, column 50, line 22, "10" should read --100--.

Signed and Sealed this

Seventeenth Day of March, 1998

*Attest:*

BRUCE LEHMAN

*Attesting Officer*        *Commissioner of Patents and Trademarks*